(12) United States Patent
Kawakami

(10) Patent No.: US 6,848,335 B1
(45) Date of Patent: *Feb. 1, 2005

(54) BICYCLE SHIFT OPERATING DEVICE FOR BICYCLE TRANSMISSION

(75) Inventor: Tatsuya Kawakami, Sakai (JP)

(73) Assignee: Shimano, Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/671,636

(22) Filed: Sep. 29, 2003

Related U.S. Application Data

(62) Division of application No. 10/041,557, filed on Jan. 10, 2002, now Pat. No. 6,694,840.

(51) Int. Cl.$^7$ ................................................ F16C 1/10
(52) U.S. Cl. ........................................ 74/502.2; 74/489
(58) Field of Search .............................. 74/502.2, 489, 74/475, 143, 142, 505, 506

(56) References Cited

U.S. PATENT DOCUMENTS

| | | | |
|---|---|---|---|
| 2,770,980 A | | 11/1956 | Millward |
| 3,220,281 A | | 11/1965 | Irgens |
| 3,633,437 A | | 1/1972 | Ishida |
| 4,900,291 A | | 2/1990 | Patterson |
| 5,044,213 A | * | 9/1991 | Nagano ........................ 74/142 |
| 5,094,120 A | | 3/1992 | Tagawa |
| 5,213,005 A | | 5/1993 | Nagano |
| 5,222,412 A | | 6/1993 | Nagano |
| 5,241,878 A | * | 9/1993 | Nagano ........................ 74/502.2 |
| 5,361,645 A | | 11/1994 | Feng et al. |
| 5,673,594 A | | 10/1997 | Huang et al. |
| 5,701,786 A | | 12/1997 | Kawakami |
| 5,730,030 A | | 3/1998 | Masui |
| 5,755,139 A | | 5/1998 | Kojima |
| 5,775,168 A | | 7/1998 | Furuta |
| 5,799,542 A | | 9/1998 | Yamane |
| 5,829,313 A | | 11/1998 | Shahana |
| 5,848,555 A | | 12/1998 | Watarai |
| 5,941,125 A | | 8/1999 | Watarai et al. |
| 5,957,002 A | | 9/1999 | Ueng |
| 6,067,875 A | | 5/2000 | Ritchey et al. |
| 6,155,132 A | | 12/2000 | Yamane |
| 6,220,111 B1 | | 4/2001 | Chen |
| 6,450,060 B1 | | 9/2002 | Shahana |
| 6,564,671 B2 | | 5/2003 | Ose |
| 2002/0139637 A1 | | 10/2002 | Tsumiyama et al. |

FOREIGN PATENT DOCUMENTS

| | | |
|---|---|---|
| DE | 37 06 545 A1 | 9/1988 |
| EP | 0671317 A1 | 9/1995 |
| JP | 54-27147 | 3/1979 |
| JP | 54-149149 A | 11/1979 |
| JP | 62-238189 A | 10/1987 |
| JP | 5-82786 U | 11/1993 |
| JP | 8-230759 A | 9/1996 |
| JP | 3188172 B2 | 7/1997 |

\* cited by examiner

*Primary Examiner*—Vinh T. Luong
(74) *Attorney, Agent, or Firm*—Shinjyu Global IP Counselors, LLP

(57) ABSTRACT

A bicycle shift operating device basically includes first operating member operatively coupled to a winding mechanism by a follower link and an operating link. A second operating member is also preferably operatively coupled to the winding mechanism. The cable winding mechanism is mounted on a first pivot axle and is configured to be selectively retained in a plurality of shift positions. In one shift operating device, the operating link is pivotally mounted on the first pivot axle. In an alternate shift operating device, the operating link is pivotally mounted on a second pivot axle that is spaced from the first pivot axle and parallel to the first pivot axle. The first operating member is preferably arranged to reciprocate in a first direction. The second operating member is preferably arranged to move in a second direction that is substantially parallel to the first direction.

10 Claims, 28 Drawing Sheets

BICYCLE SHIFT OPERATING DEVICE FOR BICYCLE TRANSMISSION

CROSS-REFERENCE TO RELATED APPLICATIONS

This application is a divisional application of U.S. patent application Ser. No. 10/041,557 filed on Jan. 10, 2002, now U.S. Pat. No. 6,694,840. The entire disclosure of U.S. patent application Ser. No. 10/041,557, now U.S. Pat. No. 6,694,840, is hereby incorporated herein by reference.

BACKGROUND OF THE INVENTION

1. Field of the Invention

This invention generally relates to a bicycle shift operating device. More specifically, the present invention relates to a shift operating device in which the shifting levers are moved in a substantially parallel direction.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One part of the bicycle that has been extensively redesigned is the bicycle transmission. Specifically, a bicycle transmission typically includes front and rear shifting mechanisms designed to operate front and rear derailleurs to move the deraillers laterally over a plurality of sprockets. The sprockets are usually coupled to the front crank and the rear wheel such that a pedaling force from the ride is transferred to the rear wheel via the chain.

In the past, shifting devices have been utilized that include one or more levers that are pivoted to wind an inner wire of a control cable. Alternatively, rotating hand grips have also be utilized to wind the inner wire of the control cable. The wires are coupled to the front and rear derailleurs to shift the chain over the various sprockets. These prior shifting devices can be complicated and expensive to manufacture and assemble. Moreover, these prior shifting devices can require uncomfortable or unnatural movements of the rider's hands to operate. Furthermore, these prior shifting devices are sometimes heavy and/or cumbersome.

In view of the above, there exists a need for a bicycle shift operating device which overcomes the above mentioned problems in the prior art. This invention addresses this need in the prior art as well as other needs, which will become apparent to those skilled in the art from this disclosure.

SUMMARY OF THE INVENTION

One object of the present invention is to provide a bicycle shift operating device with shift levers that move along substantially parallel paths.

Another object of the present invention is to provide a bicycle shift operating device that is relatively simple and inexpensive to manufacture and assemble.

Still another object of the present invention is to provide a bicycle shift operating device that provides reliable shifts of the front and rear derailleurs.

The foregoing objects can basically be attained by providing a bicycle shift operating device comprising a first operating member, a cable winding mechanism, a follower link and an operating link. The cable winding mechanism is mounted on a first pivot axle at a first fixed location and is configured to be selectively retained in one of a plurality of shift positions. The follower link has a first end pivotally coupled to the first operating member and a second end mounted on a second pivot axle at a second fixed location. The operating link has a first end pivotally coupled to the first operating member and a second end mounted on the first pivot axle. The operating link is operatively coupled to the cable winding mechanism to rotate the cable winding mechanism about the first pivot axle between the shift positions in response to movement of the first operating member.

The foregoing objects can also basically be attained by providing a bicycle shift operating device comprising a first operating member, a cable winding mechanism, an operating link and a winding pawl. The cable winding mechanism is mounted on a first pivot axle and is configured to be selectively retained in one of a plurality of shift positions. The operating link has a first end coupled to the first operating member and a second end mounted on a second pivot axle. The second pivot axle is spaced from the first pivot axle and is arranged to be parallel to the first pivot axle. The winding pawl is coupled to the operating link and is operatively engaged with the cable winding mechanism. Movement of the operating link about the second pivot axle in a first rotational direction rotates the cable winding mechanism about the first pivot axle between the shift positions in response to movement of the first operating member.

The foregoing objects can also basically be attained by providing a bicycle shift operating device comprising a first operating member, a second operating member, a cable winding mechanism and a retaining mechanism. The first operating member is arranged to reciprocate in a first direction. The second operating member is arranged to move in a second direction that is substantially parallel to the first direction. The cable winding mechanism is operatively coupled to the first operating member to rotate in a first rotational direction and is operatively coupled to the second operating member to rotate in a second rotational direction that is opposite to the first rotational direction. The retaining mechanism is operatively coupled to the cable winding mechanism to selectively hold the cable winding mechanism in one of a plurality of shift positions.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
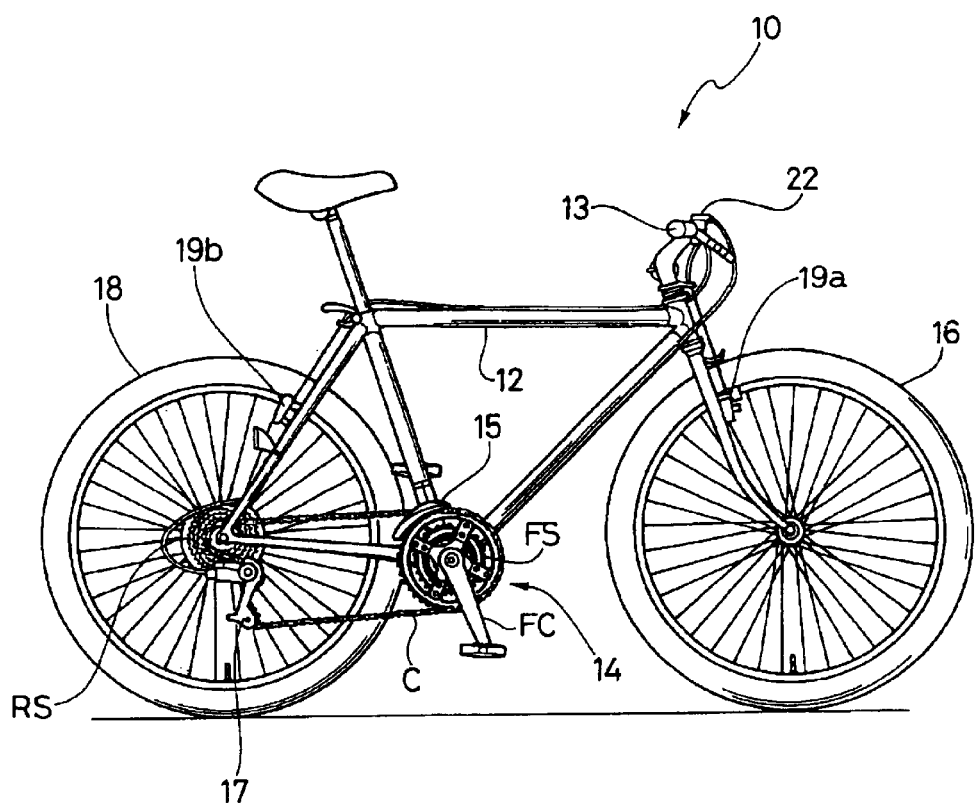
FIG. 1 is a side elevational view of a bicycle with front and rear shift operating devices coupled thereto in accordance with a preferred embodiment of the present invention.
Figure 2:
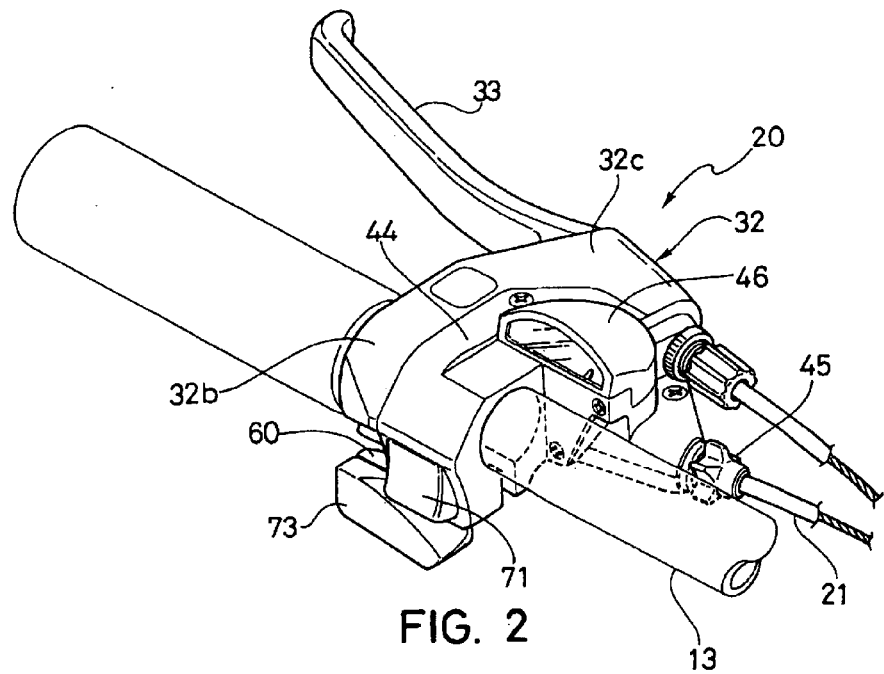
FIG. 2 is an enlarged perspective view of the front shift operating device in accordance with the present invention.
Figure 3:
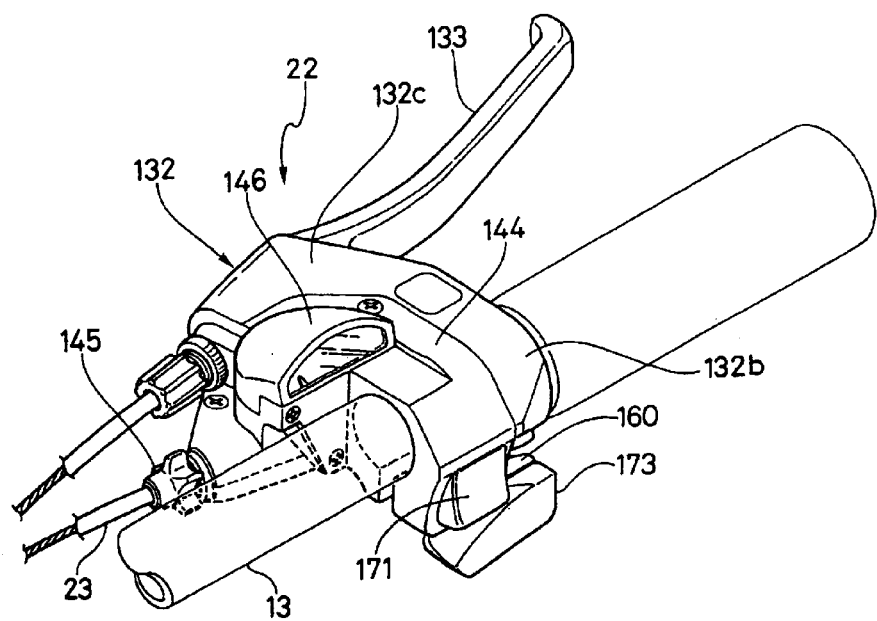
FIG. 3 is an enlarged perspective view of the rear shift operating device in accordance with the present invention.

Referring initially to FIGS. 1–3, a bicycle 10 is illustrated with a front (first) shift operating device 20 and a rear (second) shift operating device 22 is illustrated in accordance with a preferred embodiment of the present invention. Bicycle 10 basically includes a frame 12, a drive train or transmission 14, a front wheel 16 and a rear wheel 18. The frame 12 includes a handlebar 13 pivotally coupled thereto. Specifically, the handlebar 13 is fixedly coupled to the front fork of the frame 12 to steer the bicycle 10 via the front wheel 16. The drive train or transmission 14 includes a front derailleur 15, a rear derailleur 17, a chain C, a plurality of rear sprockets RS coupled to the rear wheel 18 and a front crank FC with a plurality of front sprockets FS coupled thereto. The front and rear derailleurs 15 and 17 are coupled to the frame 12 to move/shift the chain C laterally between the various sprockets FS and RS in a relatively conventional manner. The front sprockets FS are coupled to the front crank FC, while the rear sprockets RS are coupled to the rear wheel 18 via a free wheel to selectively rotate the rear wheel 18 via the chain C in order to propel the bicycle 10 in a conventional manner.

The front shift operating device 20 is operatively coupled to the front derailleur 15 via a front (first) bowden control cable 21 in order to shift the front derailleur 15 laterally over the front sprockets FS in a relatively conventional manner. Similarly, the rear shift operating device 22 is operatively coupled to the rear derailleur 17 via a rear (second) bowden control cable 23 to shift the rear derailleur 17 laterally over the rear sprockets RS in a relatively conventional manner. The front and rear control cables 21 and 23 are identical except for their lengths, and are basically conventional. In other words, each of the control cables 21 and 23 basically includes an inner wire slidably received within an outer casing.

A front brake 19a is coupled to the front fork of the bicycle frame 12, while a rear brake 19b is coupled to the rear triangle of the bicycle frame 12. The front and rear brakes 19a and 19b selectively apply a friction force to the front and rear rims of the front and rear wheels 16 and 18 to selectively stop the rotation of the front and rear wheels 16 and 18, respectively in a conventional manner.

The various parts of the bicycle 10 are conventional, except for the front and rear shift operating devices 20 and 22 as discussed below. Thus, the remaining parts of the bicycle 10 will not be discussed or illustrated in detail herein, except as they relate to the front and rear shift operating devices 20 and 22. Accordingly, it will be apparent to those skilled in the art from this disclosure that various modifications can be made to the various components or parts of the bicycle 10 without departing from the scope of the present invention.

As mentioned above, the front shift operating device 20 is operatively coupled to the front derailleur 15 via the front control cable 21, while the rear shift operating device 22 is operatively coupled to the rear derailleur 17 via the rear control cable 23. In the illustrated embodiment, each of the front and rear shift operating devices 20 and 22 includes an integrated brake operating device, as discussed below in more detail. However, it will be apparent to those skilled in the art from this disclosure that the shift operating devices 20 and 22 could be designed to be separate from the brake operating devices.

Front Shift Operating Device

Referring now to FIGS. 1, 2, 4 and 6, the front shift operating device 20 will now be discussed in more detail.

The front shift operating device 20 basically includes a mounting assembly 24, a winding mechanism 26, an operating mechanism 28 and a retaining mechanism 30 coupled together to shift the front derailleur 15 and the chain C of the drive train or transmission 14 between the front sprockets FS. In the illustrated embodiment, the front crank FC preferably has at least three front sprockets FS coupled thereto. In any event, the front shift operating device 20 preferably has a number of shift positions that corresponds to the number of shift positions of the front derailleur 15. Of course, it will be apparent to those skilled in the art from this disclosure that the front derailleur 15 and the front shift operating device 20 could be designed with a different number of shift positions if needed and/or desired.

The winding mechanism 26, the operating mechanism 28 and the retaining mechanism 30 are coupled to the mounting assembly 24. The winding mechanism 26 is controlled by the operating mechanism 28 and the retaining mechanism 30 to selectively maintain the front derailleur 15 in one of a plurality of shift positions via the control cable 21. More specifically, the operating mechanism 28 and the retaining mechanism 30 control rotation of the winding mechanism 26 to selectively retain the winding mechanism 26 in one of a plurality of shift positions. Thus, the inner wire of the control cable 21 and the front derailleur 15 are also selectively retained in one of a plurality of shift positions. The inner wire of the front control cable 21 is coupled to the winding mechanism 26 such that rotation of the winding mechanism 26 takes-up or lets-out the inner wire of the control cable 21 to actuate/move/shift the front derailleur 15 between the front sprockets FS.

The mounting assembly 24 basically includes a plurality of fixed members coupled together to form a shift operating device housing that supports the winding mechanism 26, the operating mechanism 28 and the retaining mechanism 30. More specifically, the mounting assembly 24 basically includes a main mounting portion 32, a base plate 34, an intermediate plate 36 and a lever retaining plate 38. The base plate 34, the intermediate plate 36 and the lever retaining plate 38 are basically fixedly coupled to the main mounting portion 32 by a main fixing bolt 40 (first pivot axle) and a secondary fixing bolt 42 (second pivot axle) to form the shift operating device housing. Various other parts of the front shift operating device 20 (i.e., parts of the winding mechanism 26, operating mechanism 28 and retaining mechanism 30) are either movably or non-movably coupled to the mounting assembly 24, as discussed below in more detail.

Figure 4:
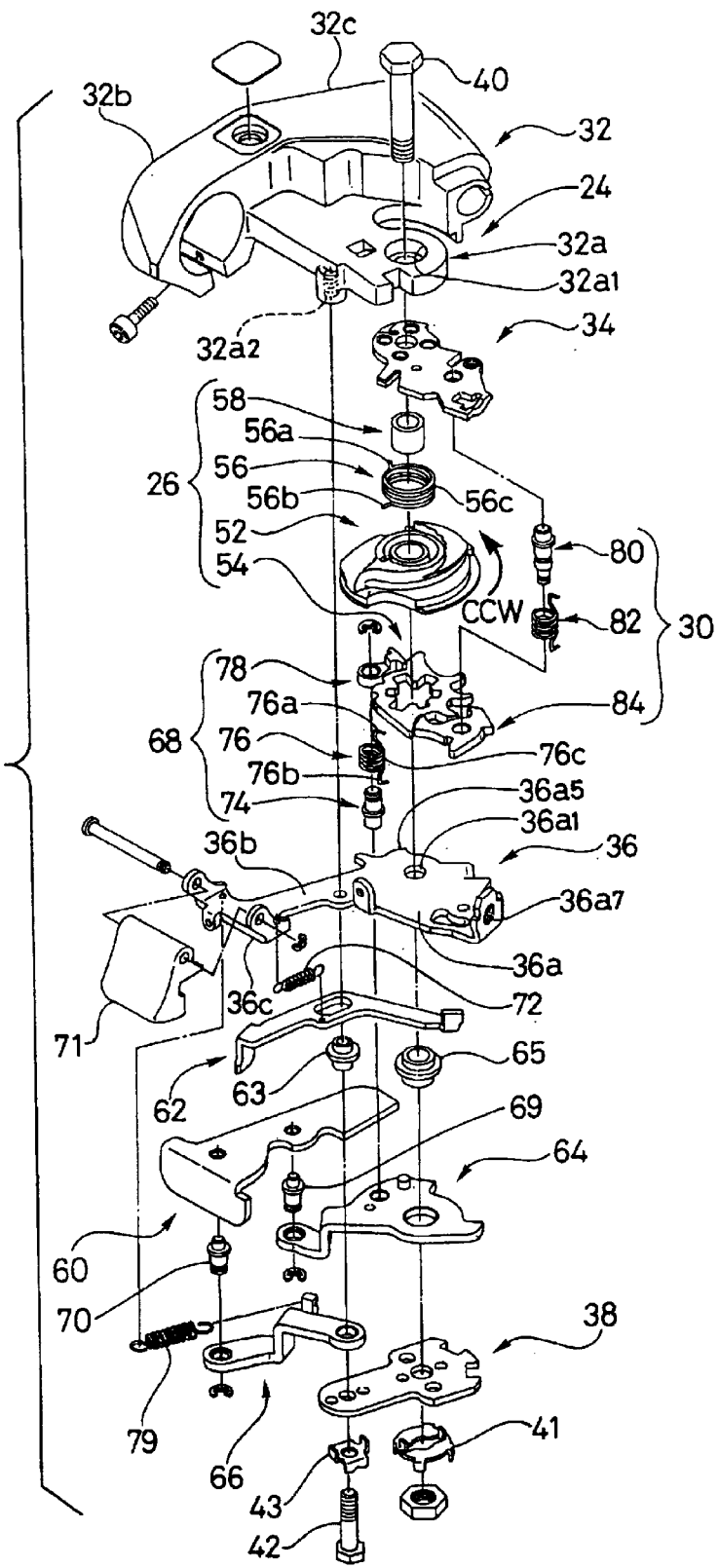
FIG. 4 is an exploded perspective view of the front shift operating device illustrated in FIG. 2.

The main mounting portion 32 basically includes a main/shift mounting plate 32a, a handlebar mounting bracket 32b and a brake lever mounting bracket 32c as best seen in FIG. 4. A brake lever 33 is pivotally coupled to the brake lever mounting bracket 32c of the main mounting portion 32 in the illustrated embodiment. The brake lever 33 is operatively coupled to the front brake 19a by a bowden brake cable in a conventional manner. Preferably, the main/shift mounting plate 32a, the handlebar mounting bracket 32b and the brake lever mounting bracket 32c are integrally formed together as a one-piece unitary member that is coupled to the handlebar 13 via the mounting bracket 32b. Thus, an integral front shift/brake operating device 20 is preferably provided. The main mounting portion 32 is preferably constructed of a lightweight rigid material such as cast aluminum. Of course, any suitable material could be utilized if needed and/or desired.

The base plate 34, the intermediate plate 36 and the retaining plate 38 are preferably fixedly coupled to the main/shift mounting plate 32a via the fixing bolts 40 and 42 in a spaced arrangement to accommodate parts of the winding mechanism 26, operating mechanism 28 and retaining mechanism 30 therebetween. More specifically, the main/shift mounting plate 32a includes a main through hole $32a_1$ and a blind threaded bore $32a_2$ configured to mount the fixing bolts 40 and 42 therein, respectively. A cover 44 and indicating mechanism 46 are also preferably fixedly coupled to the main/shift mounting plate 32a. However, the cover 44 and the indicating mechanism 46 are relatively conventional. Thus, the cover 44 and the indicating mechanism 46 will not be discussed and/or illustrated in detail herein. Moreover, the cover 44 and the indicating mechanism 46 are omitted from some Figures for the purpose of clarity. In any event, the indicating mechanism 46 is preferably operatively coupled with the shift operating device 20 to indicate the various shift positions in a conventional manner.

Figure 6:
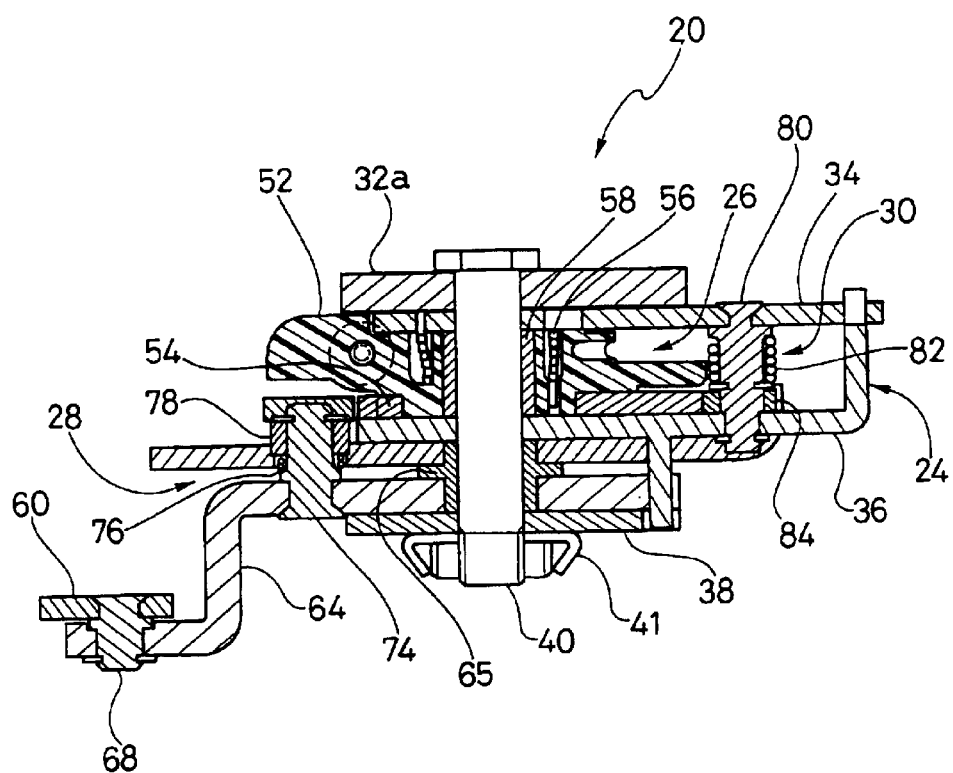
FIG. 6 is a partial, diagrammatic cross-sectional view of the front shift operating device illustrated in FIGS. 2 and 4.
Figure 7:
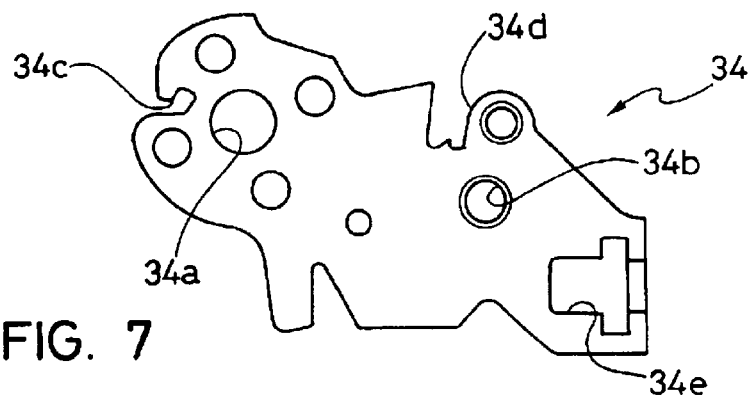
FIG. 7 is a top plan view of a base plate of the front shift operating device illustrated in FIGS. 2, 4 and 6.

As seen in FIGS. 4, 6 and 7, the base plate 34 is a relatively thin, flat member. The base plate 34 is preferably constructed of a lightweight rigid material such as sheet metal. The base plate 34 is located between the main mounting portion 32 and the intermediate plate 36 and basically has a main through bore 34a, a positioning mounting bore 34b, a spring mounting slot 34c, a projecting section 34d and a T-shaped opening 34e. The main through bore 34a is configured to receive the main fixing bolt 40 therethrough while the mounting bore 34b is configured to receive part of the retaining mechanism 30. Specifically, the retaining mechanism 30 is coupled to the positioning mounting bore 34b and the intermediate plate 36 to prevent rotation of the base plate 34 relative to the main mounting portion 32 as discussed below. Also, a portion of the intermediate plate 36 extends partially through the T-shaped opening 34e to prevent rotation of the base plate 34, and acts as a spacer as also discussed below. The spring mounting slot 34c is configured to engage a portion of the winding mechanism 26 as discussed below. The projecting section 34d is configured to engage a portion of the retaining mechanism 30 as also discussed below.

Figure 8:
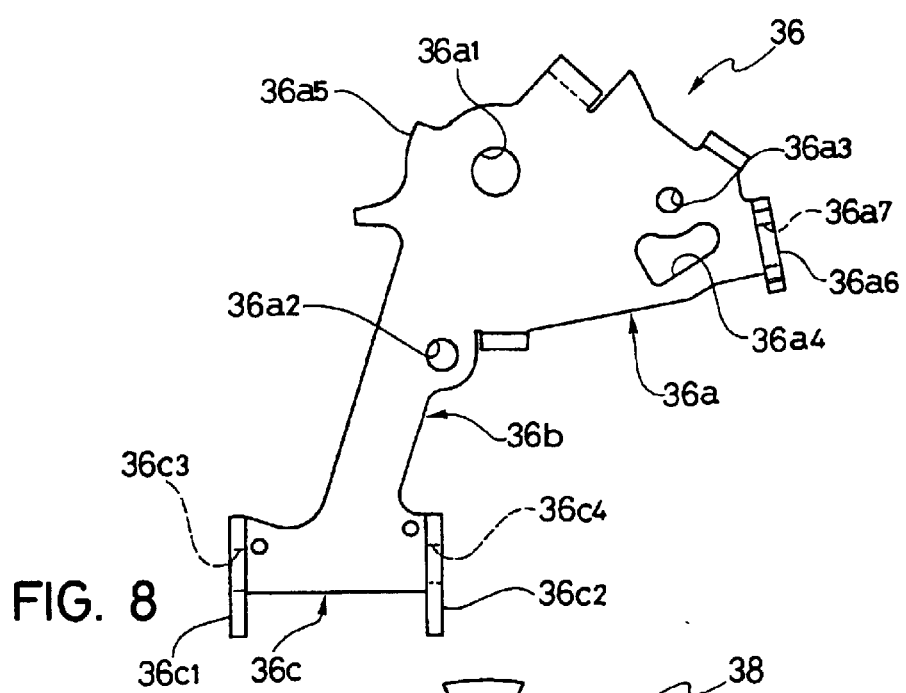
FIG. 8 is a top plan view of an intermediate plate of the front shift operating device illustrated in FIGS. 2, 4 and 6.

As seen in FIGS. 4, 6 and 8, the intermediate plate 36 is preferably formed of several thin flat portions integrally formed together as a one-piece unitary member. Moreover, the intermediate plate 36 is preferably constructed of a lightweight rigid material such as deformed sheet metal. The intermediate plate 36 is located between the base plate 34 and the lever retaining plate 38, and basically includes a base portion 36a, a connecting portion 36b, and a lever mounting portion 36c. The base portion 36a is fixedly and non-rotatably coupled to the main/shift mounting plate 32a. The connecting portion 36b extends outwardly from the base portion 36a. The lever mounting portion 36c is coupled to the free end of the connecting portion 36b.

The base portion 36a basically includes a main through hole $36a_1$, a secondary hole $36a_2$, a positioning hole $36a_3$ a guide opening $36a_4$ and a release surface $36a_5$. A flange $36a_6$ with a mounting hole $36a_7$ preferable extends from the base portion 36a to form a right angle. The main hole $36a_1$ is configured to receive the main fixing bolt 40 therethrough, while the secondary hole $36a_2$ is configured to receive the secondary fixing bolt 42 therethrough. Thus, the base portion 36a is non-rotatably coupled to the main mounting portion 32. The retaining mechanism 30 is coupled to the positioning hole $36a_3$ and the hole 34b such that the base plate 34 is also non-rotatably coupled to the main mounting portion 32 via the base portion 36a, as discussed below.

The guide opening $36a_4$ is configured to receive a portion of the operating mechanism 28 as discussed below in more detail. The release surface $36a_5$ is configured to selectively engage a portion of the operating mechanism 28 as also explained below. The flange $36a_6$ extends partially through the T-shaped opening 34e of the base plate 34 to non-rotatably couple the base plate 34 to the intermediate plate 36. The flange $36a_6$ also acts as a spacer between the base plate 34 and the intermediate plate 36 due to the stepped configuration of the flange $36a_6$. The mounting hole $36a_7$ receives a fastener 45 to couple the control cable 21 thereto.

The lever mounting portion 36c includes first and second mounting flanges $36c_1$ and $36c_2$, respectively. The mounting flanges $36c_1$ and $36c_2$ include holes $36c_3$ and $36c_4$, respectively, that are configured to receive a portion of the operating mechanism 28, as also discussed below in more detail. The connecting portion 36b extends between the lever mounting portion 36c and the base portion 36a such that the lever mounting portion 36c is spaced outwardly from the base portion 36a.

Figure 9:
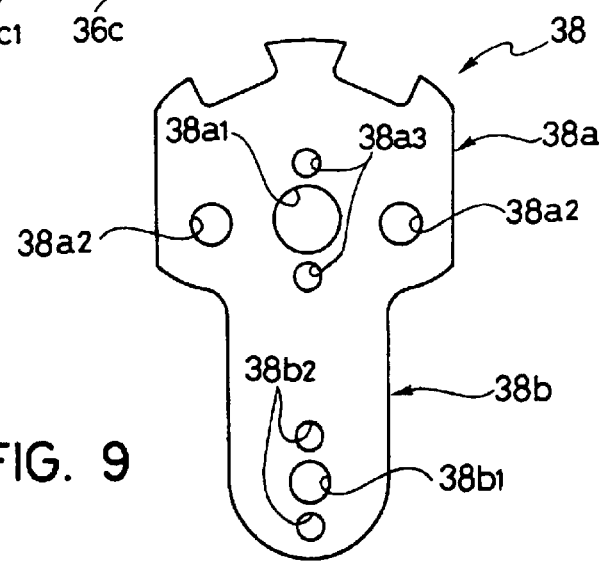
FIG. 9 is a top plan view of a lever retaining plate of the front shift operating device illustrated in FIGS. 2, 4 and 6.
Figure 10:
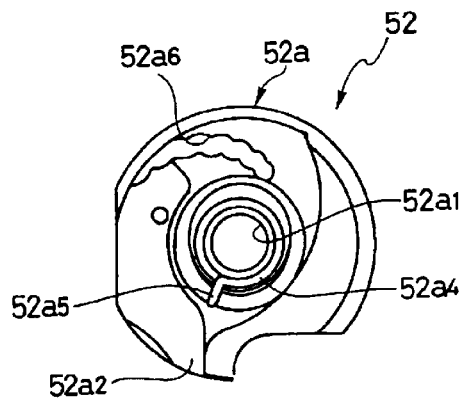
FIG. 10 is a top plan view of a cable winding of the front shift operating device illustrated in FIGS. 2, 4 and 6.
Figure 11:
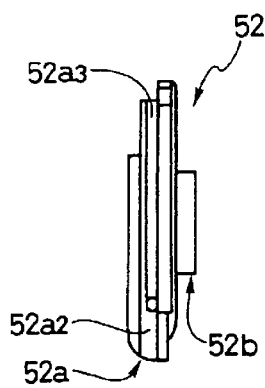
FIG. 11 is a side elevational view of the cable winding member illustrated in FIG. 10.
Figure 12:
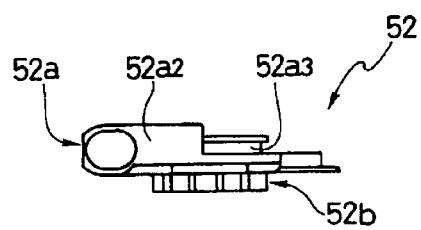
FIG. 12 is an end elevational view of the cable winding member illustrated in FIGS. 10 and 11.
Figure 14:
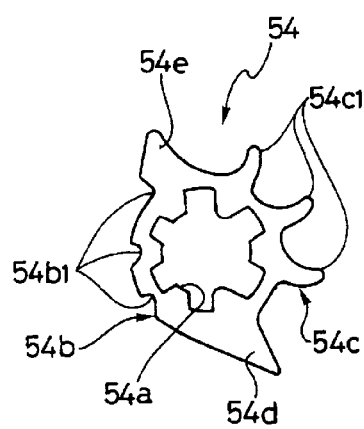
FIG. 14 is a top plan view of a ratchet member of the front shirt operating device illustrated in FIGS. 2, 4 and 6.
Figure 13:
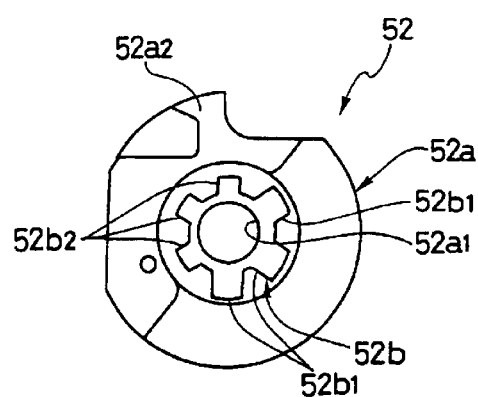
FIG. 13 is a bottom plan view of the cable winding member illustrated in FIGS. 10–12.

As seen in FIGS. 4, 6 and 9, the lever retaining plate 38 is preferably a thin flat member. The lever retaining plate 38 is preferably constructed of a lightweight rigid material such as sheet metal. The lever retaining plate 38 is located on an opposite side of the intermediate plate 36 from the base plate 34. Thus, the lever retaining plate 38 is located furthest from the main mounting portion 32. The lever retaining plate 38 is fixedly and non-rotatably coupled to the main/shift plate 32a via the fixing bolts 40 and 42. The lever retaining plate 38 basically includes a main support portion 38a and an extending portion 38b.

The main support portion 38a has a main hole $38a_1$, a pair of opposed auxiliary holes $38a_2$, and a pair of opposed retaining holes $38a_3$. The main hole $38a_1$ is configured to receive the main fixing bolt 40 therethrough. In this embodiment, the auxiliary holes $38a_2$ are not used. However, one of these auxiliary holes $38a_2$ is used in the rear shift operating device 22, discussed below. The pair of retaining holes $38a_3$ are configured to receive projections of a main nut plate 41 to prevent loosening of the main fixing bolt 40 after the parts of the mounting assembly 24 are coupled together.

The extending portion 38b includes a secondary hole $38b_1$ and a pair of retaining holes 38b. The secondary hole $38b_1$ is configured to receive the secondary fixing bolt 42 therethrough. The retaining holes $38b_2$ are configured to receive projections of a secondary bolt plate 43 to prevent loosening of the secondary fixing bolt 42 after the parts of the mounting assembly 24 are coupled together. Thus, the lever retaining plate 38, the intermediate plate 36, the base plate 34 and the main/shift plate 32a are fixedly and non-rotatably coupled together to form the housing or mounting assembly 24.

Referring to FIGS. 4, 6 and 10–14, the winding mechanism 26 will now be discussed in more detail. The winding mechanism 26 is mounted on the main fixing bolt 40 between the base plate 34 and the intermediate plate 36 of the mounting assembly 24. The winding mechanism 26 basically includes a cable winding member 52, a ratchet member 54, a main biasing member 56 and a unit spacer 58. In the illustrated embodiment, the winding member 52 and the ratchet member 54 are preferably separate members that are non-rotatably coupled together. The main biasing member 56 is preferably a torsion spring that normally biases the winding member 52 and the ratchet member 54 in a predetermined rotational direction, e.g., the counter-clockwise direction CCW as seen in FIG. 4. The winding mechanism 26 is operatively coupled to the operating mechanism 28 and the retaining mechanism 30 to selectively retain the winding member 52 in one of a plurality of shift positions.

The winding member 52 is preferably a step-shaped member integrally formed as a one-piece unitary member. Moreover, the winding member 52 is preferably constructed of a lightweight rigid material such as hard plastic. The winding member basically includes a winding portion 52a and a projecting portion 52b. A central through opening $52a_1$ extends through both the winding portion 52a and the projecting portion 52b and is configured to receive the main fixing bolt 40 therethrough. Thus, the winding member 52 is coupled to the mounting assembly 24 for rotation about the main fixing bolt 40. The ratchet member 54 is preferably non-rotatably coupled to the winding member 52 and is located between the winding member 52 and the intermediate plate 36. Thus, the ratchet member 54 rotates with the winding member 52. As explained below, the rotational movement of the winding member 52 is controlled by the ratchet member 52.

The winding portion 52a basically has a cable mounting section $52a_2$, a winding surface $52a_3$ and a spring receiving recess $52a_4$. The cable mounting section $52a_2$ includes a through opening configured to receive the inner wire of the control cable 21 and a recess configured to receive a nipple or abutment of the inner wire of the control cable 21 in a conventional manner. The winding surface $52a_3$ is a curved groove-shaped surface which extends circumferentially away from the cable mounting section $52a_2$. The spring receiving recess $52a_4$ is a substantially annular recess with a larger diameter than the central through opening $52a_1$. Moreover, the spring receiving recess $52a_4$ includes a cutout or notch $52a_5$ configured to receive one end of the spring 56 as discussed below. The spring receiving recess $52a_4$ preferably has a radial width sufficient to receive a portion the main spring 56 as also discussed below in more detail. The winding portion 52a also preferably includes a stepped groove $52a_6$ configured to receive a portion (not shown) of the indicating mechanism 46.

The projecting portion 52b basically includes a plurality of large splines $52b_1$ and a plurality of small splines $52b_2$ that are configured to non-rotatably engage the ratchet member 54. The large splines $52b_1$ are arranged on an opposite side of the central through opening $52a_1$ from the small splines $52b_2$. Moreover, the splines $52b_1$ and $52b_2$ are oriented such that the ratchet member 54 is arranged in a certain configuration in order to properly engage both the operating mechanism 28 and the retaining mechanism 30, as discussed below.

The ratchet member 54 is preferably a thin flat member. Preferably, the ratchet member 54 is constructed of a lightweight rigid material such as sheet metal. The ratchet member 54 basically includes a splined central opening 54a, an outer operating surface 54b and an outer positioning surface 54c. The splined opening 54a is configured to receive the projecting portion 52b of the winding member 52 to non-rotatably couple the ratchet member 54 to the winding member 52 in a predetermined orientaion. In other words, the opening 54a mates with the large splines $52b_1$ and the small splines $52b_2$ of the projecting portion 52b so that the winding member 52 rotates with the ratchet member 54 as if they were a single piece.

The operating surface 54b is configured to engage a portion of the operating mechanism 28, which is discussed below. More specifically, the operating surface 54b includes a plurality (three) of grooves $54b_1$ designed to selectively engage a portion of the operating mechanism 28. The positioning surface 54c is configured to engage a portion of the retaining mechanism 30 (which is also discussed below) to selectively hold and retain the ratchet member 54 and the winding member 52 in one of the plurality of shift positions. More specifically, the positioning surface 54c includes a plurality (three) of projections or teeth $54c_1$ which engage a portion of the retaining mechanism 30. The ratchet member 54 also preferably includes a pair of stops 54d and 54e. Specifically, the stop 54d is a rest stop while the stop 54e is a fully shifted stop. The stops 54d and 54e selectively engage portions of the retaining mechanism 30 to control movements of the winding member 52 and the ratchet member 54.

As best seen in FIG. 4, the biasing member 56 is preferably a torsion spring that is arranged to apply an urging force on the winding member 52 and the ratchet member 54 to rotate about the main fixing bolt 40. The biasing member (spring) 56 basically includes a first end 56a, a second end 56b and a coiled portion 56c extending between the first and second ends 56a and 56b. The first end 56a is arranged in the spring mounting slot 34c of the base plate 34, while the second end 56b is arranged in the notch or cutout $52a_5$ extending from the spring receiving recess $52a_4$ of the winding member 52. The coiled portion 56c is partially received in the spring receiving recess $52a_4$. The unit spacer 58 is disposed in the central through opening $52a_1$ of the winding member 52.

The unit spacer 58 is preferably a tubular member constructed of lightweight rigid material with one end contacting the lower surface of the base plate 34 and the other end contacting the intermediate plate 36. The spring 56 is configured to normally bias the winding member 52 in a counter-clockwise direction CCW as viewed from above in FIG. 4. Thus, the operating mechanism 28 moves the winding member 52 via the ratchet member 54 in a clockwise direction against the urging force of the main biasing member 56. More specifically, the operating mechanism 28 preferably moves the winding member 52 to one of three predetermined shift positions, as discussed below. The retaining mechanism 30 selectively retains the winding member 52 and the ratchet member 54 in one of the three shift positions, as also discussed below.

Figure 32:
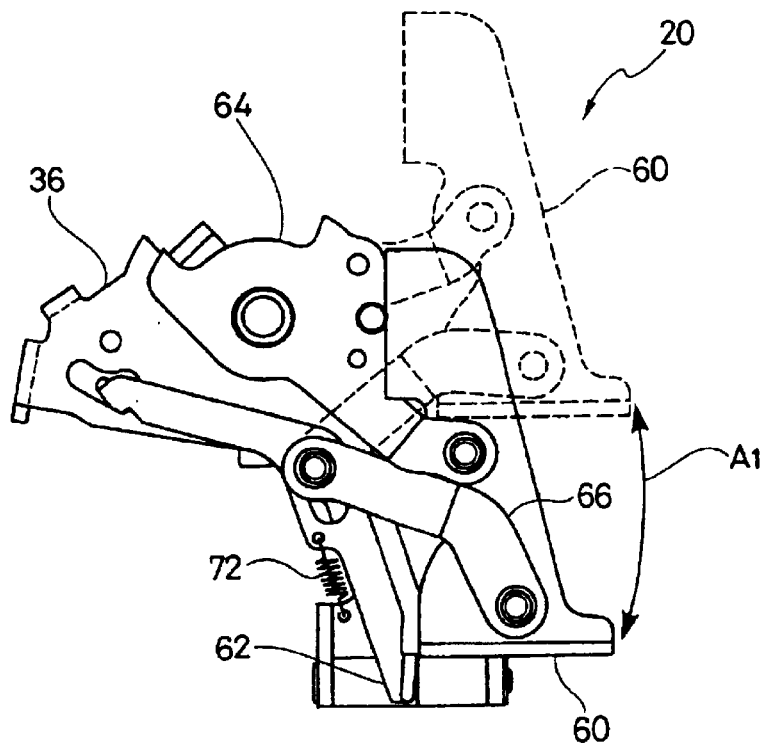
FIG. 32 is a bottom plan view of certain parts of the front shift operating device illustrated in FIGS. 2, 4 and 6 showing the first shift operating member in a normal rest position in solid lines, and in a shift postion in broken lines for the purpose of illustration.
Figure 33:
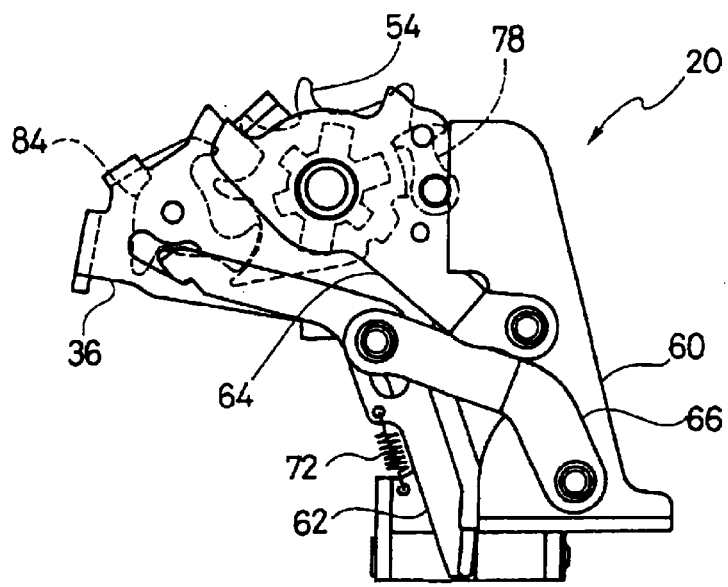
FIG. 33 is a bottom plan view of certain parts of the front shift operating device illustrated in FIGS. 2, 4 and 6 showing the first shift operating member in a normal rest position in solid lines with the ratchet member, pawl member and locking member shown in broken lines for the purpose of illustration.
Figure 34:
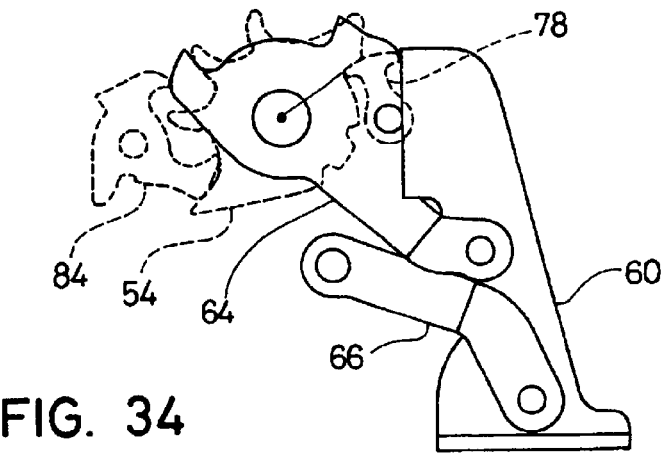
FIG. 34 is a bottom plan view of certain parts of the front shift operating device illustrated in FIGS. 2, 4 and 6 with the first shift operating member in a normal rest position and with the ratchet member, pawl member and locking member shown in broken lines in order to illustrate operation of the front shift operating device.
Figure 35:
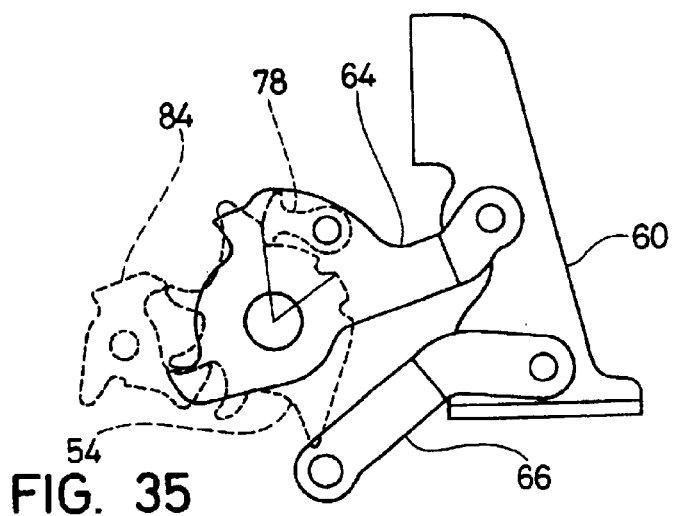
FIG. 35 is a bottom plan view of certain parts of the front shift operating device illustrated in FIGS. 2, 4 and 6 with the first shift operating member in a shift position and with the ratchet member, pawl member and locking member shown in broken lines in shifted positions in order to illustrate operation of the front shift operating device.
Figure 36:
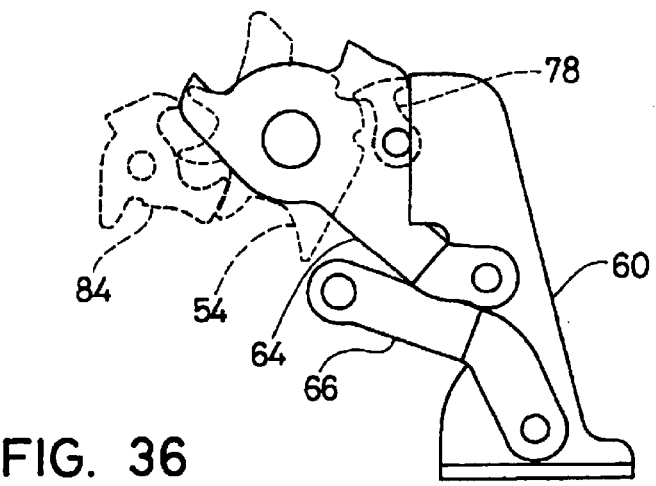
FIG. 36 is a bottom plan view of certain parts of the front shift operating device illustrated in FIGS. 2, 4 and 6 with the first shift operating member moved back to the normal rest position and with the ratchet member, pawl member and locking member shown in broken lines after being shifted in order to illustrate operation of the front shift operating device.
Figure 37:
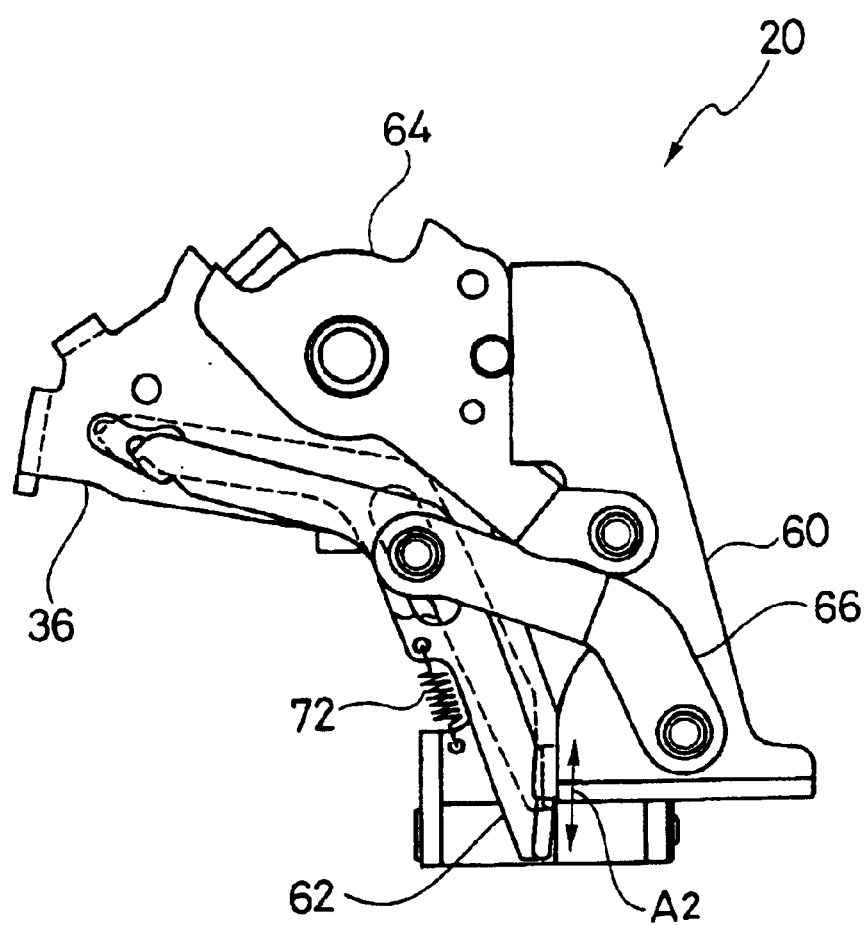
FIG. 37 is a bottom plan view of certain parts of the front shift operating device illustrated in FIGS. 2, 4 and 6 showing the second shift operating member in a normal rest position in solid lines, and in a shift postion in broken lines for the purpose of illustration.

Referring now to FIGS. 4, 6 and 15–27, the operating mechanism 28 will now be discussed in more detail. The operating mechanism 28 basically includes a first operating member 60, a second operating member 62, an operating link 64 and a follower link 66. The first operating member 60 together with the operating link 64, the follower link 66 and the mounting assembly 24 form a four-bar linkage that controls movement of the first operating member 60. More specifically, the first operating member 60 is pivotally coupled to both the operating link 64 and the follower link 66 to move along a first arc $A_1$. The operating link 64 is pivotally coupled to the main fixing bolt 40, while the follower link 66 is pivotally coupled to the secondary fixing bolt 42. The first arc $A_1$ has a relatively flat curvature such that the first operating member 60 moves substantially in a straight line as best seen in FIG. 32.

The operating link 64 preferably has a pawl mechanism 68 operatively coupled thereto. The pawl mechanism 68 is configured to engage the operating surface 54b of the ratchet member 54 when the first operating member 60 is pushed or moved by the rider from the normal rest position to the shift position. Thus, when the first operating member 60 is moved in a substantially linear direction along the arc $A_1$, the operating link 64 is also moved such that the pawl mechanism 68 rotates the ratchet member 54 one shift position against the urging force of the biasing member 56. Thus, the winding member 52 is also rotated to pull the inner wire of the shift cable 21 and shift the front derailleur 15 to one of its shift positions.

When the first operating member 60 moves back to the normal rest position, the pawl mechanism 68 engages the release surface $36a_5$ of the intermediate plate 36 to disengage the pawl mechanism from the ratchet member 54. However, the retaining mechanism 30 engages the ratchet member 54 to hold the winding member 52 and the ratchet member 54 in the new shift position against the urging force of the spring 56. In the illustrated embodiment, movement of the first operating member 60 causes only one shift of the winding member 52 from one shift position to the next adjacent shift position in one rotational direction.

The second operating member 62 is operatively coupled to the retaining mechanism 30 to selectively release the ratchet member 54 and the winding member 52. In other words, the rider pushes or moves the second operating member 62 to disengage the retaining mechanism 30 from the ratchet member 54, which allows the winding member 52 and the ratchet member 54 to rotate under the urging force of the spring 56. The retaining mechanism 30 is configured and arranged so that the winding member 52 and the ratchet member 54 rotate only one shift position for each push of the second operating member 62. In other words, the ratchet member 54 engages the retaining mechanism 30 after rotating one shift position. Thus, in the illustrated embodiment, movement of the second operating member 62 causes only one shift of the winding member 52 from one shift position to the next adjacent shift position in another rotational direction opposite to the rotational direction caused by moving the first operating member 60.

Figure 15:
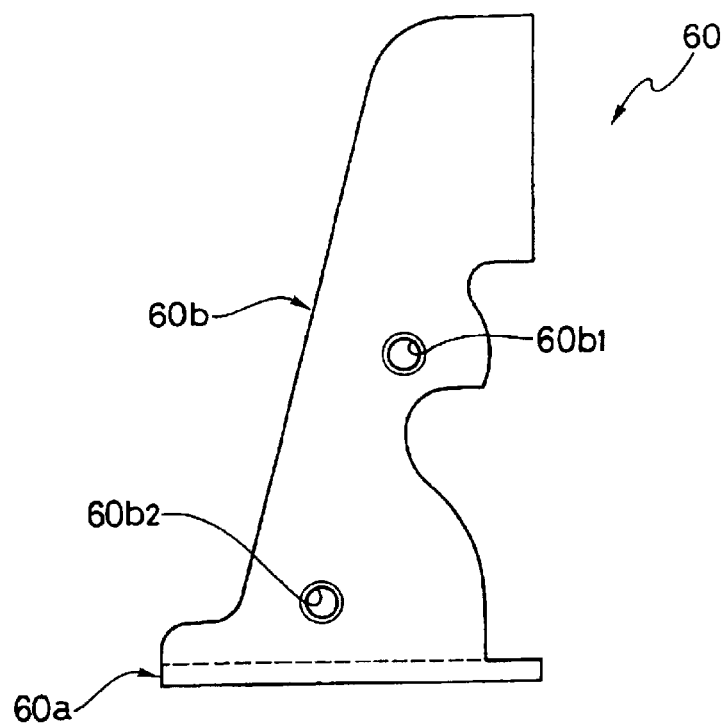
FIG. 15 is a top plan view of a fast operating member of the front shift operating device illustrated in FIGS. 2, 4 and 6.
Figure 16:
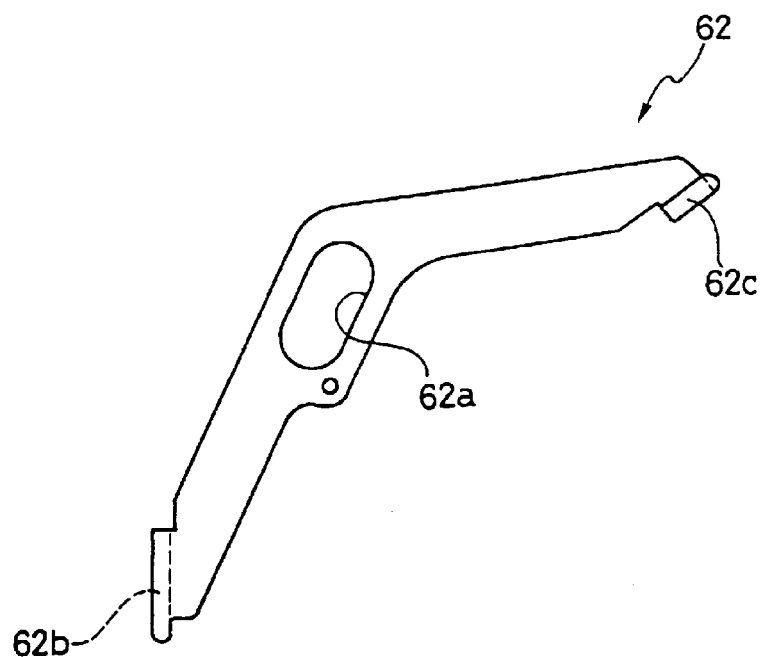
FIG. 16 is a top plan view of a second operating member of the front shift operating device illustrated in FIGS. 2, 4 and 6.
Figure 17:
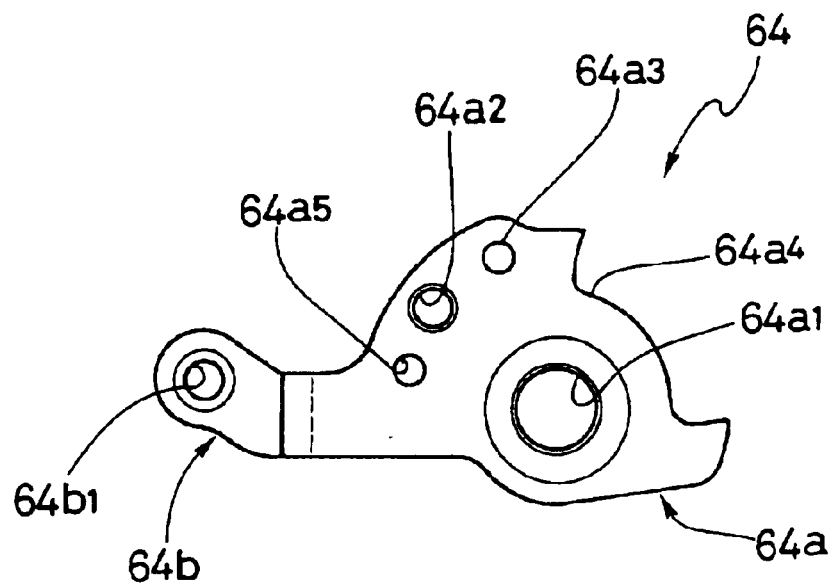
FIG. 17 is a top plan view of an operating link of the front shift operating device illustrated in FIGS. 2, 4 and 6.
Figure 18:
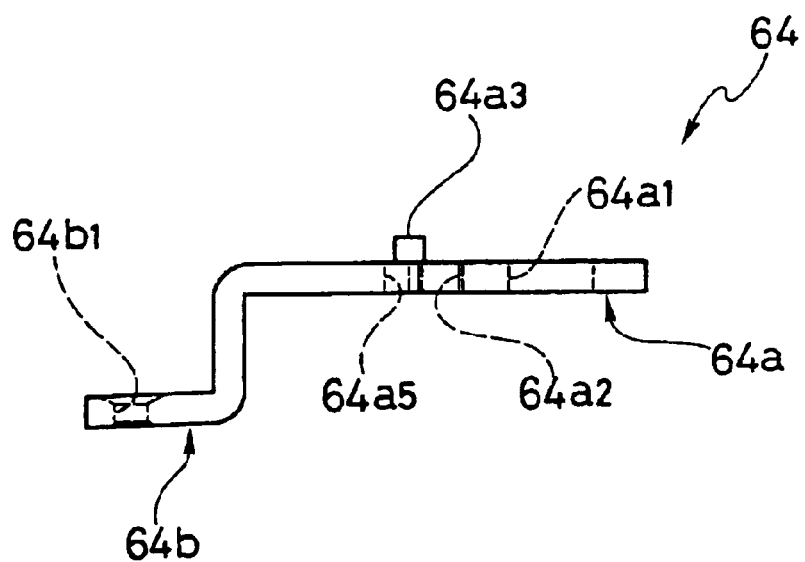
FIG. 18 is a side elevational view of the operating link illustrated in FIG. 17.
Figure 19:
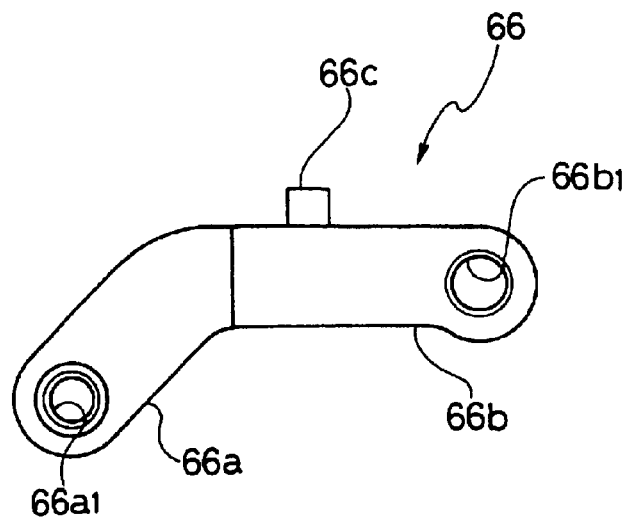
FIG. 19 is a top plan view of a follower link of the front shift operating device illustrated in FIGS. 2, 4 and 6.
Figure 20:
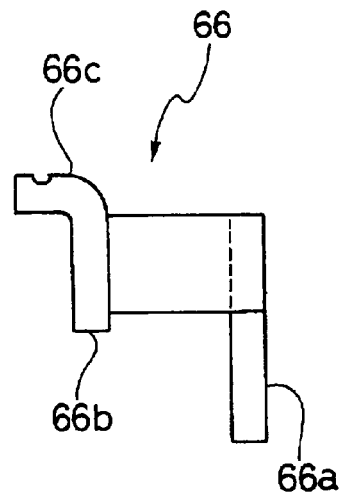
FIG. 20 is a side elevational view of the follower link illustrated in FIG. 19.
Figure 21:
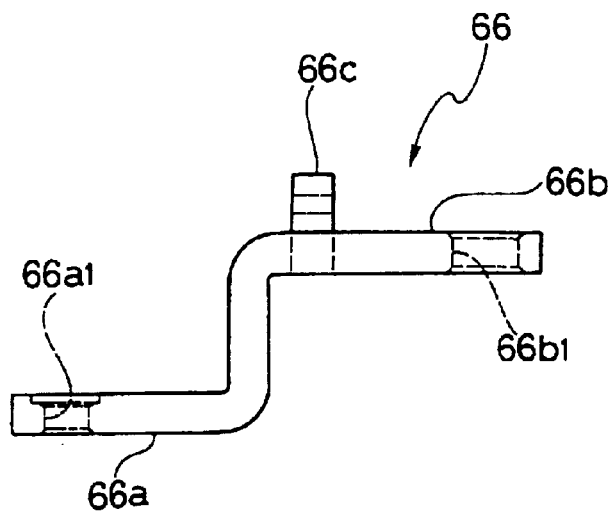
FIG. 21 is an end elevational view of the follower link illustrated in FIGS. 19 and 20.
Figure 22:
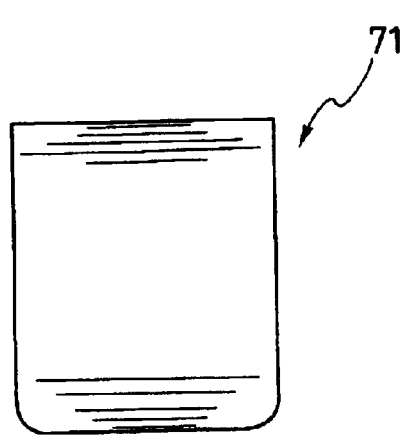
FIG. 22 is a front elevational view a tap lever of the front shift operating device illustrated in FIGS. 2, 4 and 6.
Figure 23:
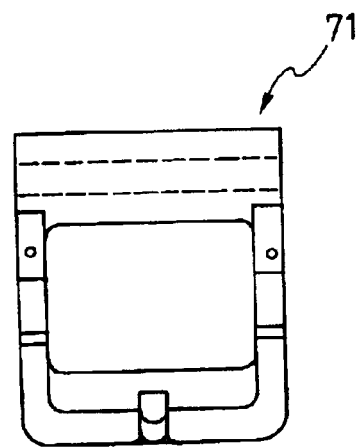
FIG. 23 is a rear elevational view of the tap lever illustrated in FIG. 22.
Figure 24:
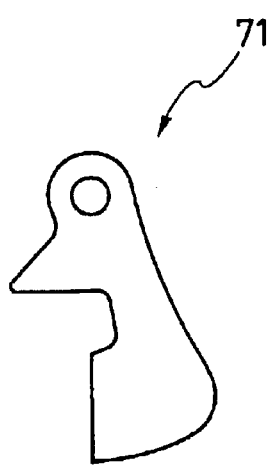
FIG. 24 is a side elevational view of the tap lever illustrated in FIGS. 22 and 23.
Figure 25:
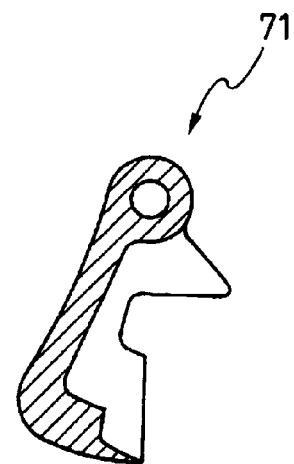
FIG. 25 is a cross-sectional view of the tap lever illustrated in FIGS. 22–24 as seen alone section line 25—25 of FIG. 22.
Figures 26, 27:
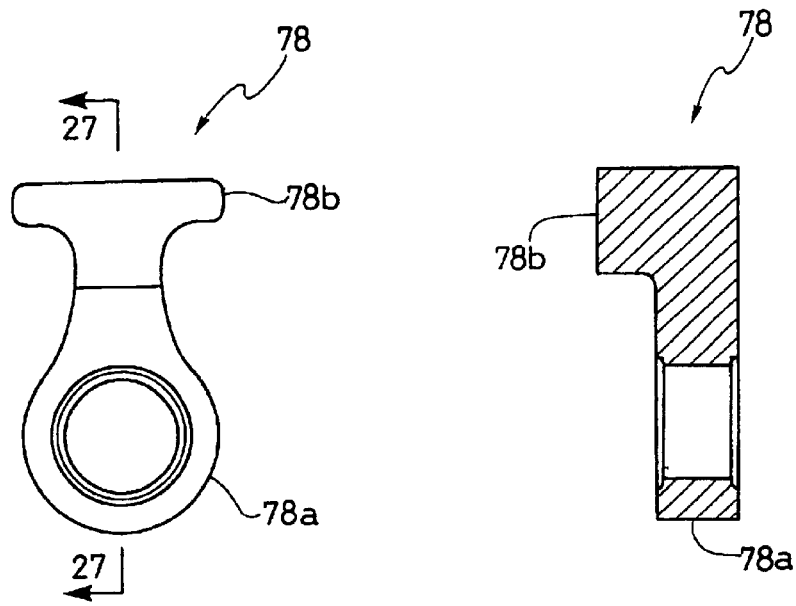
FIG. 26 is a top plan view of a pawl member of the front shift operating device illustrated in FIGS. 2, 4 and 6.
FIG. 27 is a cross-sectional view of the pawl member illustrated in FIG. 26 as seen along section line 27—27 of FIG. 26.

As best seen in FIGS. 4 and 15, the first operating member 60 is a thin flat member. The first operating member 60 is preferably constructed of lightweight rigid material such as deformed sheet metal. The first operating member 60 basically includes an actuating portion 60a and a link portion 60b. The link portion 60b is preferably perpendicular to the actuating portion 60a. The link portion 60b includes a pair of holes $60b_1$ and $60b_2$ that are configured to receive the upper ends of a pair of pivot pins 69 and 70, respectively. The pivot pin 69 is pivotally coupled to the operating link 64, while the pivot pin 70 is pivotally coupled to the follower link 66 such that the first operating member 60 moves along the first arc $A_1$. The actuating portion 60a can have a button 73 coupled thereto as seen in FIG. 2, and is arranged to be actuated or pushed by a thumb or finger of the rider.

The second operating member 62 is preferably a thin flat member constructed of lightweight rigid material such as deformed sheet metal. The second operating member 62 is slidably and pivotally mounted on the secondary fixing bolt 42. More specifically, the second operating member 62 is pivotally and slidably mounted on a spacer 63 that is mounted on the second fixings bolt 42 between the second operating member 62 and the follower link 66. The second operating member 62 basically includes an elongated opening 62a, an actuating flange 62b and a release flange 62c. The elongated opening 62a has an upper end of the spacer 63 received therein. The release flange 62c is received in the guide opening $36a_4$ of the intermediate plate 36 to control movement of the second operating member 62 together with the spacer 63, which is fisted.

Figure 38:
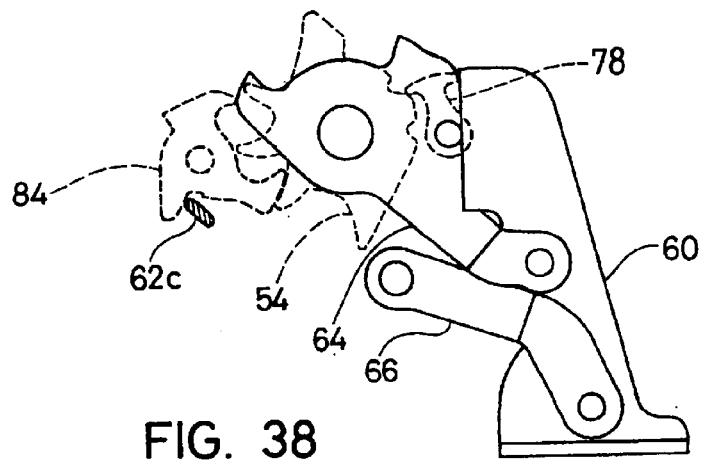
FIG. 38 is a bottom plan view of certain parts of the front shift operating device illustrated in FIGS. 2, 4 and 6 with the second shift operating member in a normal rest position and with the ratchet member, pawl member and locking member shown in broken lines in shifted positions in order to illustrate operation of the front shift operating device.
Figure 39:
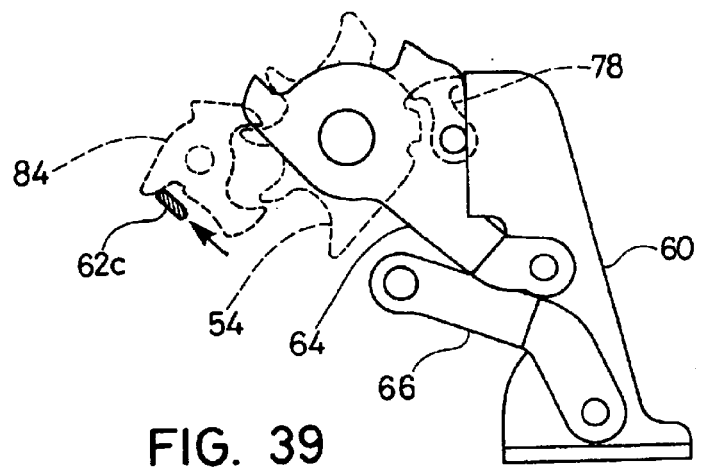
FIG. 39 is a bottom plan view of certain parts of the front shift operating device illustrated in FIGS. 2, 4 and 6 with the second shift operating member in a shift position and with the ratchet member, pawl member and locking member shown in broken lines in intermediate positions in order to illustrate operation of the front shift operating device.
Figure 40:
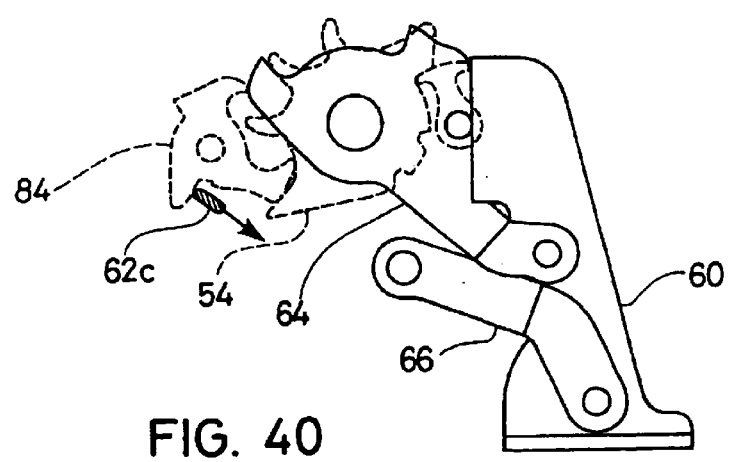
FIG. 40 is a bottom plan view of certain parts of the front shift operating device illustrated in FIGS. 2, 4 and 6 with the second shift operating member moved back to the normal rest position and with the ratchet member, pawl member and locking member shown in broken lines after being shifted in order to illustrate operation of the front shift operating device.

The second operating member 62 is actuated by a tap lever 71 that is pivotally coupled to the mounting flanges $36c_1$ and $36c_2$ of the intermediate plate 36. More specifically, the tap lever 71 is operatively coupled to the actuating flange 62b such that when the rider pushes the tap lever 71 with a thumb or finger, the second operating member 62 moves in a substantially linear direction along a second arc $A_2$ as best seen in FIG. 38. More specifically, the release flange 62c is received in the guide opening $36a_4$ of the intermediate plate 36, while the upper end of the spacer 63 is received in the elongated opening 62a such that the actuating flange 62b moves along the arc $A_2$.

The arc $A_2$ is substantially parallel to the arc $A_1$ and both arcs preferably have large radii of curvature such that substantially linear parallel movement between the first and second operating members 60 and 62 is achieved. A return biasing member or spring 72 is operatively coupled between the second operating member 62 and the intermediate plate 36. Thus, when the rider releases the tap lever 71, the second operating member 62 and the tap lever 71 return to a normal rest position. The guide opening $36a_4$ of the intermediate plate 36 and the release flange 62c are configured to selectively engage/actuate the retaining mechanism 30 as discussed below.

The operating link 64 is preferably a thin flat step-shaped member constructed of a lightweight rigid material such as deformed sheet metal. More specifically, the operating link 64 basically includes an operating portion 64a and a coupling portion 64b. As mentioned above, the operating link 64 is pivotally coupled to the main fixing bolt 40 and the pivot pin 69, which is pivotally coupled to the first operating member 60. The operating portion 64a basically includes a main hole $64a_1$, a pawl mounting hole $64a_2$, a projection $64a_3$, a cutout $64a_4$ and a spring mounting hole $64a_5$.

A spacer 65 is mounted on the main fixing bolt 40. The spacer 65 has a step-shaped exterior surface with a bottom end mounted in the main hole $64a_1$ of the operating link 64. The upper end of the spacer 65 contacts the intermediate plate 36 and surrounds the main hole $36a_1$ of the intermediate plate 36. Thus, the operating portion 64a of the operating link 64 is spaced from the intermediate plate 36 and rotatably mounted on the spacer 65.

The pawl mechanism 68 is coupled to the pawl mounting hole $64a_2$ and basically includes a pawl pivot pin 74, a pawl spring 76 and a pawl member 78. The pawl pivot pin 74 has a lower end mounted in the pawl mounting hole $64a_2$ of the operating link 64. The pawl member 78 is mounted on the upper end of the pawl pivot pin 74 with the pawl spring 76 normally biasing the pawl member 78 relative to the operating link 64. Specifically, the pawl spring 76 has an upper end 76a coupled to the pawl member 78, a lower end 76b received in a spring mounting hole $64a_5$ of the operating link 64 and a coiled portion 76c surrounding the pawl pivot pin 74. The projection $64a_3$ and the cutout $64a_4$ of the operating link 64 act as stop members or movement controlling members of the operating link 64. More specifically, the projection $64a_3$ and the cutout $64a_4$ are configured such that portions of the operating link 64 do not interfere with the movement of other members of the front shift operating device 20 and/or control movement of the operating link 64.

The pawl member 78 basically includes a mounting portion 78a and a pawl portion 78b. The mounting portion 78a is thinner than the pawl portion 78b and is received on the pawl pivot pin 74. The pawl portion 78b is configured to selectively contact the operating surface 54b of the ratchet member 54. Specifically, when the operating link 64 is moved by the first operating member 60, the pawl portion 78b engages one of the grooves $54b_1$ of the operating surface 54b to rotate the ratchet member 54 and the winding member 52 about the main fixing bolt 40. However, when the first operating member 60 and the operating link 64 are in a normal rest position, the pawl portion 78b contacts the outer release surface $36a_5$ of the intermediate plate 36.

In other words, the outer release surface $36a_5$ is shaped to hold the pawl portion 78b out of engagement with the grooves $54b_1$ of the operating surface 54b when the operating link 64 and the first operating member 60 are in their normal rest positions. Thus, if the second operating member 62 is actuated by the tap lever 71, e.g., if the retaining mechanism 30 is released as discussed below, the ratchet member 54 and the winding member 52 can rotate due to the urging force of the main biasing member 56.

The coupling portion 64b of the operating link 64 is offset from the operating portion 64a and basically includes a coupling hole $64b_1$. The coupling hole $64b_1$ is configured to receive the tower end of the pivot pin 69 that is pivotally coupled to the first operating member 60.

Referring again to FIGS. 4 and 19–21, the follower link 66 basically includes an operating portion 66a, a coupling portion 66b and a protrusion 66c. The follower link 66 is preferably a step-shaped thin flat member constructed of lightweight rigid material such as deformed sheet metal. The operating portion 66a is pivotally coupled to the pivot pin 70 that is pivotally coupled to the first operating member 60. The coupling portion 66b is pivotally coupled to the secondary fixing bolt 42 via the spacer 63. The operating portion 66a is offset from the coupling portion 66b. The protrusion 66c extends upwardly from the coupling portion 66b and is configured to receive one end of a return biasing member (spring) 79.

More specifically, the operating portion 66a includes a hole $66a_1$ configured to rotatably receive a lower end of the pivot pin 70 while the coupling portion 66b includes a hole $66b_1$ configured to receive the lower end of the spacer 63. The return biasing member 79 has one end coupled to the protrusion 66c and the other end coupled to the intermediate plate 36 to normally urge the follower link 66 to the rest position. Thus, the first operating member 60 and the first operating link 64 are also normally biased to the rest position by the return biasing member (spring) 79 since these members form three links of a four-bar linkage assembly.

Figure 28:
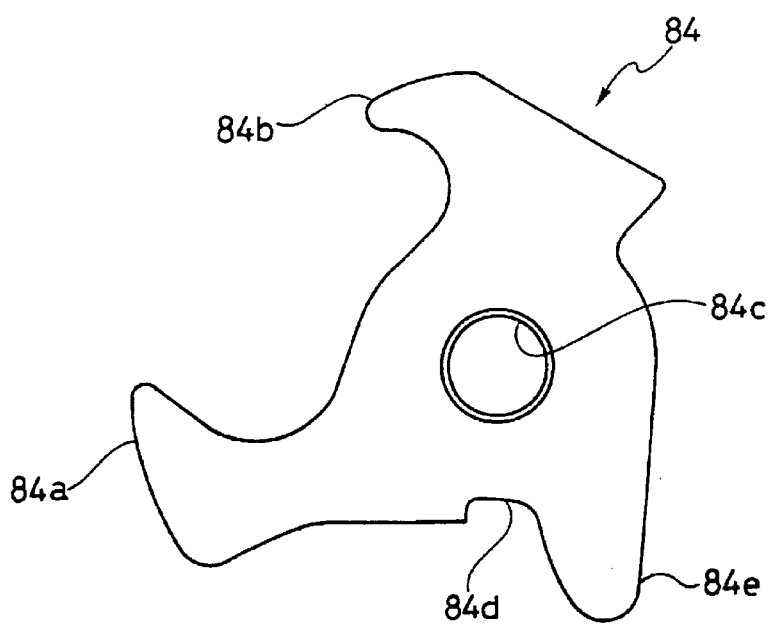
FIG. 28 is a top plan view of a locking member of the front shift operating device illustrated in FIGS. 2, 4 and 6.
Figure 29:
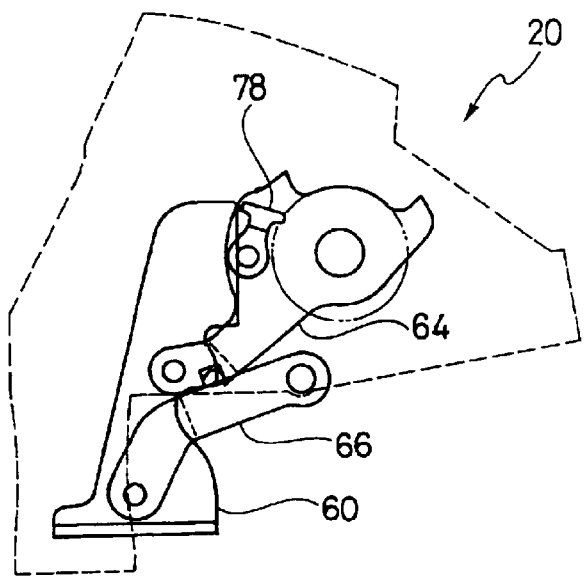
FIG. 29 is a partial top plan view of the front shift operating device illustrated in FIGS. 2, 4 and 6 with the first shift operating member in a rest position and portions broken away for the purpose of illustration.
Figure 30:
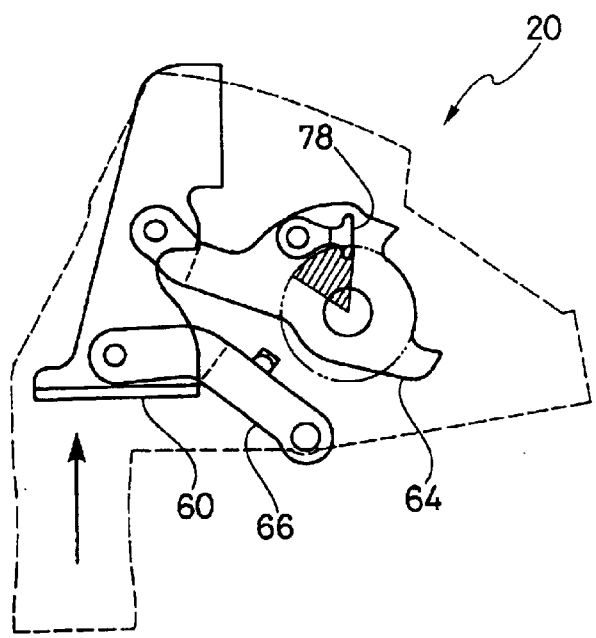
FIG. 30 is a partial top plan view of the front shift operating device illustrated in FIGS. 2, 4 and 6 with the first shift operating member in a shift position after moving the operating link an operating angle and portions broken away for the purpose of illustration.
Figure 31:
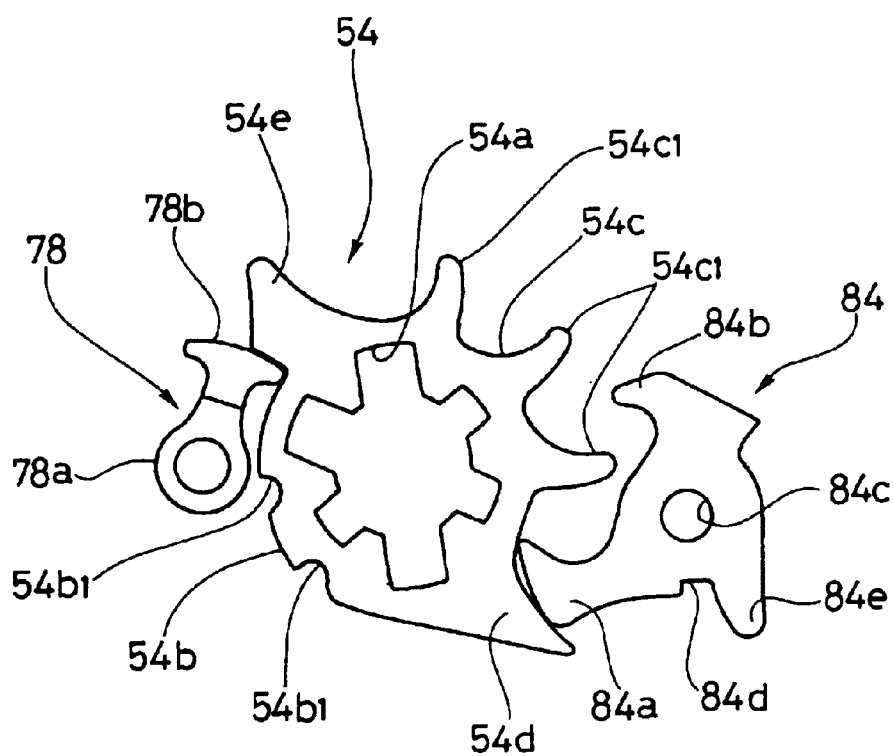
FIG. 31 is a top plan view of the pawl member, ratchet member and locking member of the front shift operating device illustrated in FIGS. 2, 4 and 6, showing the engagement/relationship between these members.

Referring now to FIGS. 4, 6 and 28, the retaining mechanism 30 will now be discussed in more detail. The retaining mechanism 30 basically includes a retaining pivot pin 80, a retaining biasing member 82 and a locking member 84. The retaining pivot pin 80 is coupled to the base plate 34 and the intermediate plate 36. The locking member 84 is rotatably mounted on the retaining pivot pin 80. The retaining biasing member 82 normally biases the locking member 84 toward a predetermined position. The locking member 84 is arranged and configured to engage the positioning surface 54c of the ratchet member 54. Moreover, the locking member 84 is also arranged and configured to selectively engage the release flange 62c of the second operating member 62.

More specifically, the retaining pivot pin 80 has an upper end received in the mounting bore 34b of the base plate 34, and a lower end received in the positioning hole $36a_3$ of the intermediate plate 36. Thus, the retaining pivot pin 80 and the base plate 34 are non-movable relative to the main mounting portion 32. The locking member 84 is arranged on the lower end of the retaining pivot pin 80 adjacent the guide opening $36a_4$ of the intermediate plate 36. The biasing member 82 has an upper end engaged with the projecting section 34d of the base plate 34 and a lower end engaged with the locking member 84 to normally bias the locking member 84 in a predetermined direction.

The locking member 84 basically includes a first stop portion 84a, a second stop portion 84b, a central hole 84c, a spring receiving recess 84d and an actuating projection 84e. The lower end of the retaining pivot pin 80 is received in the hole 84c such that the locking member 84 is located between the base plate 34 and the intermediate plate 36. The first and second stop portions 84a and 84b are arranged on opposite lateral sides of the teeth $54c_1$ of the ratchet member 54. The spring receiving recess 84d is configured to receive the lower end of the biasing member 82. The actuating projection 84e is arranged adjacent the release flange 62c of the second operating member 62 that is received in the guide opening $36a_4$.

When the second operating member 62 is actuated by the tap lever 71, the release flange 62c engages the actuating projection 84e to rotate the locking member 84 against the biasing force of the sprint 82. This moves the first stop portion 84a out of engagement with the positioning surface 54c. Thus, the ratchet member 54 and the winding member 52 are rotated one shift position due to the biasing force of the main biasing member or spring 56. When the tap lever 71 is released, the locking member 84 rotates via the biasing force of the spring 82 to engage the next tooth of the positioning surface 54c to hold the ratchet member 54 and the winding member 52 in the desired shift position.

Operation of the front shift operating device 20 will now be discussed in more detail with reference to FIGS. 4, 6 and 29–40. When the rider wishes to shift the front derailleur 15 and the chain C from a smaller front sprocket FS to a larger front sprocket FS, the rider pushes the first operating member 60 with a thumb or finger. The first operating member 60 moves along the arc $A_1$ to the shift position. This movement of the first operating member 60 causes both the operating link 64 and the follower link 66 to rotate about the main and secondary fixing bolts 40 and 42, respectively. When the operating link 64 rotates about the main fixing bolt 40, the pawl mechanism 68 moves with the operating link 64.

When the pawl mechanism 68 moves, the pawl member 78 moves out of engagement with the release surface $36a_5$ of the intermediate plate 36. The pawl member 78 then engages the ratchet member 54 to rotate the ratchet member 54 and the winding member 52 one shift position. When the ratchet member is rotated from one shift position to the next adjacent shift position by the pawl mechanism 68, the locking member 84 is moved out of engagement with its respective tooth $54c_1$ and into engagement with the next respective tooth $54c_1$. Specifically, as the ratchet member 54 moves between two shift positions, the locking member 84 disengages and then reengages the teeth $54c_1$ to retain the ratchet member 54 in the next shift position.

When the first operating member 60 is released by the rider, the first operating member 60 moves back along the first arc $A_1$ to its normal rest position. This movement of the first operating member 60 causes the operating link 64 and the follower link 66 to rotate about the main and secondary fixing bolts 40 and 42, respectively. The operating link 64 and the follower link 66 rotate until they return to their normal rest positions. The pawl mechanism 78 moves with the operating link 64. Thus, the pawl member 78 moves back into engagement with the release surface $36a_5$ so that the pawl member 78 is out of engagement with the operating surface 54b of the ratchet member 54. However, the ratchet member 54 is retained in its shift position due to the locking member 84. If the rider desires to shift from a smaller front sprocket FS to a larger front sprocket FS again, the first operating member 60 is pushed again along the first arc $A_1$ and the process described above is repeated.

If the rider desires to shift the front derailleur 15 and the chain C from a larger front sprocket FS to a smaller front sprocket FS, the rider pushes the tap lever 71 with a thumb or finger. When the tap lever 71 is actuated by the rider, the second operating member 62 moves along the second arc $A_2$ from the normal rest position to the shift position. Specifically, movement of the second operating member 62 is controlled by the guide opening $36a_4$ of the intermediate plate and the spacer 63, which is coupled to the secondary fixing bolt 42. When the second operating member 62 is moved to the shift position, the release flange 62c engages the locking member 84. The locking member 84 is rotated against the biasing force of the spring 82 out of engagement with the teeth $54c_1$ of the ratchet member 54. The ratchet member 54 can then rotate under the biasing force of the main biasing member or spring 56.

The locking member 84 will then engage the next adjacent tooth $54c_1$ upon releasing the second operating member 62. Specifically, when the rider pushes the tap lever 71, the locking member 84 is disengaged from the teeth $54c_1$. However, when the rider then releases the tap lever 71, the second operating member 62 will return to its normal rest position under the biasing force of the return spring 72. Thus, the release flange 62c will release the locking member 84. In other words, the second operating member 62 is designed to be tapped and released relatively quickly by the rider. The locking member 84 then non-rotatably engages the next adjacent tooth $54c_1$ of the ratchet member 54 and the shift from the larger front sprocket FS to the smaller front sprocket FS is complete. This process can then be repeated by the rider if desired.

Of course, if the chain C is already on the smallest front sprocket FS, the stops between the locking member 84 and the ratchet member 54 will prevent disengagement with the teeth $54c_1$. Therefore, if the rider pushes the tap lever 71 when the front derailleur 15 is positioned over the smallest front sprocket FS, a shift will not occur. Likewise, if the front derailleur 15 is in its top position such that the chain C is arranged on the largest front sprocket FS, the first operating member 60 cannot be shifted due to the stops between the locking member 84 and the ratchet member 54. Thus, a shift will not occur in this situation.

Rear Shift Operating Device

Figure 5:
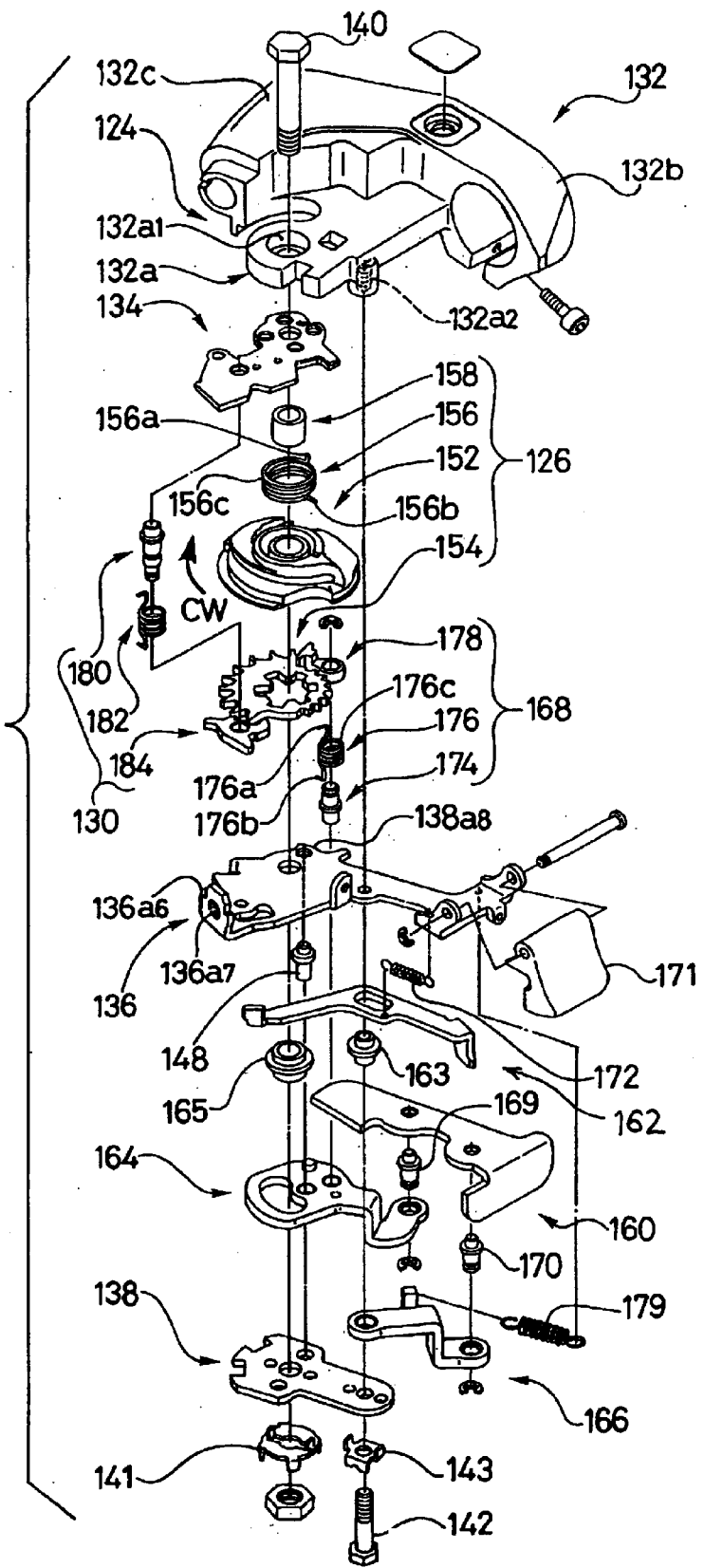
FIG. 5 is an exploded perspective view of the rear shift operating device illustrated in FIG. 3.

Referring now to FIGS. 3 and 5, the rear shift operating device 22 will now be discussed in more detail. The rear shift operating device 22 is substantially identical to the front shift operating device 20 except that certain parts of the rear shift operating device have been modified so that the rear shift operating device 22 has more shift positions than the front shift operating device 20. Specifically, the rear shift operating device 22 is designed to include more shift positions than the front shift operating device 20 because the rear derailleur 17 has more shift positions than the front derailleur 15. However, the rear shift operating device 22 utilizes operating members that have the same or almost the same stroke as the front shift operating device 20, as discussed below. In other words, the rear shift operating device 22 is configured to be used with the rear derailleur 17, which is designed to shift between a number of rear sprockets RS larger than the number of front sprockets FS.

The rear shift operating device 22 basically includes a mounting assembly 124, a winding mechanism 126, an operating mechanism 128 and a retaining mechanism 130 coupled together to shift the rear derailleur 17 and the chain C of the drive train or transmission 14 between the rear sprockets RS. In the illustrated embodiment, the transmission 14 preferably has more than three rear sprockets RS coupled thereto. More specifically, in the illustrated embodiment, the transmission preferably has nine rear sprockets RS. Thus, the rear shift operating device 22 also preferably has more than three shift positions. More specifically, the rear shift operating device 22 preferably has nine shift positions. In any event, the rear shift operating device 22 preferably has a number of shift positions that corresponds to the number of shift positions of the rear derailleur 17. Of course, it will be apparent to those skilled in the art from this disclosure that the rear derailleur 17 and the rear shift operating device 22 could be designed with a different number of shift positions if needed and/or desired.

The winding mechanism 126, the operating mechanism 128 and the retaining mechanism 130 are coupled to the mounting assembly 124. The winding mechanism 126 is controlled by the operating mechanism 128 and the retaining mechanism 130 to selectively maintain the rear derailleur 17 in one of a plurality of shift positions via the control cable 23. More specifically, the operating mechanism 128 and the retaining mechanism 130 control rotation of the winding mechanism 126 to selectively retain the winding mechanism 126 in one of the plurality of shift positions. Thus, the inner wire of the control cable 23 and the rear derailleur 17 are also selectively retained in one of a plurality of shift positions. The inner wire of the rear control cable 23 is coupled to the winding mechanism 126 such that rotation of the winding mechanism 126 takes-up or lets-out the inner wire of the control cable 23 to actuate/move/shift the rear derailleur 17 between the rear sprockets RS.

The mounting assembly 124 basically includes a plurality of fixed members coupled together to form a shift operating device housing that supports the winding mechanism 126, the operating mechanism 128 and the retaining mechanism 130. More specifically, the mounting assembly 124 basically includes a main mounting portion 132, a base plate 134, an intermediate plate 136 and a lever retaining plate 138. The base plate 134, the intermediate plate 136 and the lever retaining plate 138 are basically fixedly coupled to the main mounting portion 132 by a main fixing bolt 140 (first fixed pivot axle) and a secondary fixing bolt 142 (second fixed pivot axle) that are preferably parallel to each other to form the shift operating device housing. Various other parts of the rear shift operating device 22 (i.e., parts of the winding mechanism 126, operating mechanism 128 and retaining mechanism 130) are either movably or non-movably coupled to the mounting assembly 124, as discussed below in more detail.

The main mounting portion 132 basically has a main/shift mounting plate 132*a*, a handlebar mounting bracket 132*b* and a brake lever mounting bracket 132*c* as best seen in FIGS. 3 and 5. A brake lever 133 is pivotally coupled to the brake lever mounting bracket 132*c* of the main mounting portion 132 in the illustrated embodiment. The brake lever 133 is operatively coupled to the near brake 19*b* by a bowden brake cable in a conventional manner. Preferably, the main/shift mounting plate 132*a*, the handlebar mounting bracket 132*b* and the brake lever mounting bracket 132*c* are integrally formed together as a one-piece unitary member that is coupled to the handlebar 13 via the mounting bracket 132*b*. Thus, an integral rear shift/brake operating device 22 is preferably provided. The main mounting portion 132 is preferably constructed of a lightweight rigid material such as cast aluminum. Of course, any suitable material could be utilized if needed and/or desired.

The base plate 134, the intermediate plate 136 and the retaining plate 138 are preferably fixedly coupled to the main/shift mounting plate 132*a* via the fixing bolts 140 and 142 in a spaced arrangement to accommodate parts of the winding mechanism 126, operating mechanism 128 and retaining mechanism 130 therebetween. More specifically, the main/shift mounting plate 132*a* includes a main through hole 132$a_1$ and blind threaded bore 132$a_2$ configured to mount the fixing bolts 140 and 142 therein, respectively. A cover 144 and indicating mechanism 146 are also preferably fixedly coupled to the main/shift mounting plate 132*a*. However, the cover 144 and the indicating mechanism 146 are relatively conventional. Thus, the cover 144 and the indicating mechanism 146 will not be discussed and/or illustrated in detail herein. Moreover, the cover 144 and the indicating mechanism 146 are omitted from some Figures for the purpose of clarity. In any event, the indicating mechanism 146 is preferably operatively coupled with the shift operating device 22 to indicate the various shift positions in a conventional manner.

Figure 41:
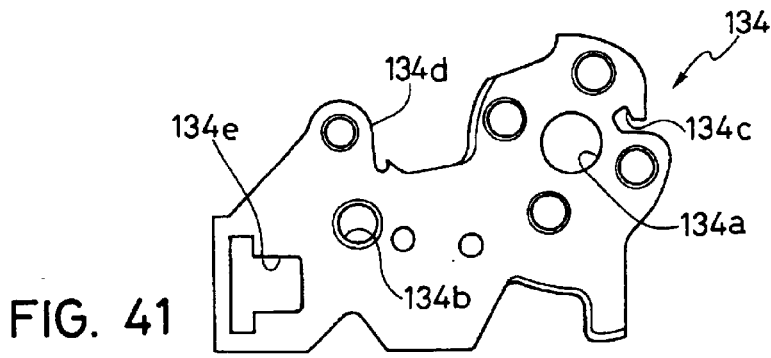
FIG. 41 is a top plan view of a base plate of the rear shift operating device illustrated in FIGS. 3 and 5.

As seen in FIGS. 5 and 41, the base plate 134 is a relatively thin, flat member. The base plate 134 is preferably constructed of a lightweight rigid material such as sheet metal. The base plate 134 is located between the main mounting portion 132 and the intermediate plate 136 and basically has a main through bore 134*a*, a positioning mounting bore 134*b*, a spring mounting slot 134*c*, a projecting section 134*d* and a T-shaped opening 134*e*. The main through bore 134*a* is configured to receive the main fixing bolt 140 therethrough, while the mounting bore 134*b* is configured to receive part of the retaining mechanism 130. Specifically, the retaining mechanism 130 is coupled to the positioning mounting bore 134*b* and the intermediate plate 136 to prevent rotation of the base plate 134 relative to the main mounting portion 132 as discussed below. Also, a portion of the intermediate plate 136 extends partially through the T-shaped opening 134*e* to prevent rotation of the base plate 134, and acts as a spacer as also discussed below. The spring mounting slot 134*c* is configured to engage a portion of the winding mechanism 126 as discussed below. The projecting section 134*d* is configured to engage a portion of the retaining mechanism 130 as also discussed below.

Figure 42:
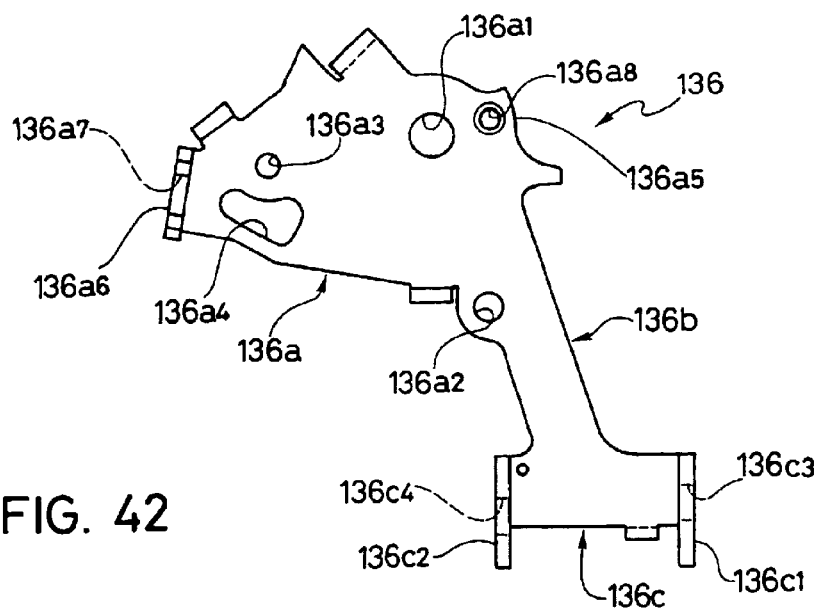
FIG. 42 is a top plan view of an intermediate plate of the rear shift operating device illustrated in FIGS. 3 and 5.

As seen in FIGS. 5 and 42, the intermediate plate 136 is preferably formed of several thin flat portions integrally formed together as a one-piece unitary member. Moreover, the intermediate plate 136 is preferably constructed of a lightweight rigid material such as deformed sheet metal. The intermediate plate 136 is located between the base plate 134 and the lever retaining plate 138, and basically has a base portion 136*a*, a connecting portion 136*b*, and a lever mounting portion 136*c*. The base portion 136*a* is fixedly and non-rotatably coupled to the main/shift plate 132*a*. The connecting portion 136*b* extends outwardly from the base portion 136*a*. The lever mounting portion 136*c* is coupled to the free end of the connecting portion 136*b*.

The base portion 136*a* basically includes a main through hole 136$a_1$, a secondary hole 136$a_2$, a positioning hole 136$a_3$ a guide opening 136$a_4$ and a release surface 136$a_5$. A flange 136$a_6$ with a mounting hole 136*a* preferable extends from the base portion 136*a* to form a right angle. An auxiliary hole 136$a_8$ is arranged between the main through hole 136$a_1$ and the release surface 136$a_5$. The main hole 136$a_1$ is configured to receive the main fixing bolt 140 therethrough while the secondary hole 136$a_2$ is configured to receive the secondary fixing bolt 142 therethrough. Thus, the base portion 136*a* is non-rotatably coupled to the main mounting portion 132. The retaining mechanism 130 is coupled to the positioning hole 136$a_3$ and the hole 134*b* such that the base plate 134 is non-rotatably coupled to the main mounting portion 132 via the base portion 136*a*, as discussed below.

The guide opening $136a_4$ is configured to receive a portion of the operating mechanism 128 as discussed below in more detail. The release surface $136a_5$ is configured to selectively engage a portion of the operating mechanism 128 as also explained below. The flange $136a_6$ extends partially through the T-shaped opening 134e of the base plate 134 to non-rotatably couple the base plate 134 to the intermediate plate 136. The flange $136a_6$ also acts as a spacer between the base plate 134 and the intermediate plate 136 due to the stepped configuration of the flange $136a_6$. The mounting hole $136a_7$ receives a fastener 145 to couple the control cable 23 thereto. The auxiliary hole $136a_8$ is configured to receive a pivot pin 148 (auxiliary, fixed pivot axle) therein. A portion of the operating mechanism 128 is rotatably mounted or coupled on the pivot pin 148 as explained below. The pivot pin 148 is preferably arranged to be parallel to the main fixing bolt 40 (first pivot axle).

The lever mounting portion 136c includes first and second mounting flanges $136c_1$ and $136c_2$, respectively. The mounting flanges $136c_1$ and $136c_2$ include holes $136c_3$ and $136c_4$, respectively, that are configured to receive a portion of the operating mechanism 128, as also discussed below in more detail. The connecting portion 136b extends between the lever mounting portion 136c and the base portion 136a such that the lever mounting portion 136c is spaced outwardly from the base portion 136a.

Figure 43:
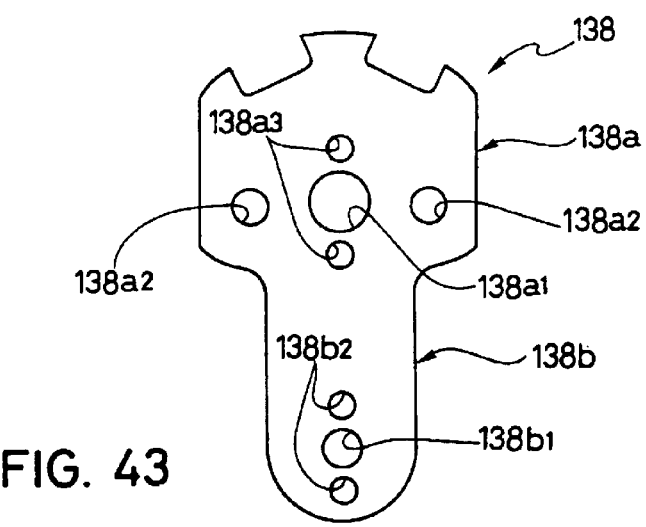
FIG. 43 is a top plan view of a lever retaining plate of the rear shift operating device illustrated in FIGS. 3 and 5.
Figure 44:
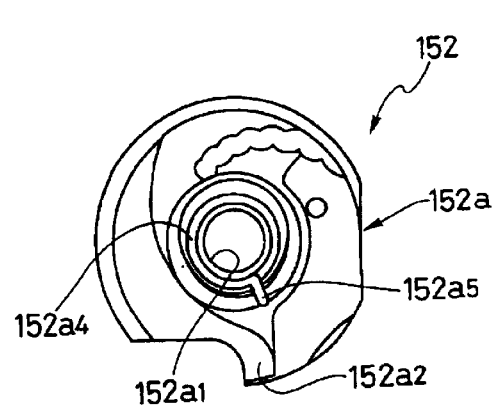
FIG. 44 is a top plan view of a cable winding of the rear shift operating device illustrated in FIGS. 3 and 5.
Figure 45:
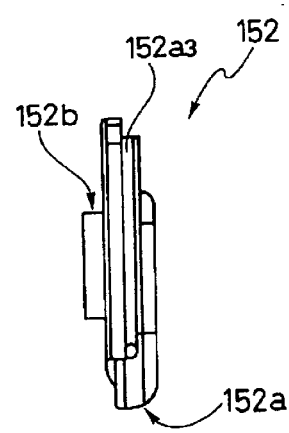
FIG. 45 is a side elevational view of the cable winding member illustrated in FIG. 44.
Figure 46:
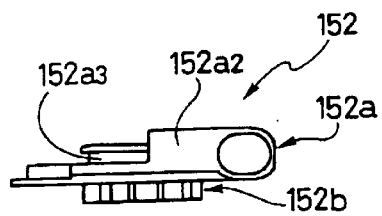
FIG. 46 is an end elevational view of the cable winding member illustrated in FIGS. 44 and 45.
Figure 48:
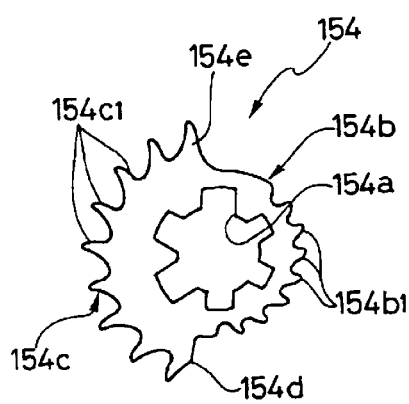
FIG. 48 is a top plan view of a ratchet member of the rear shift operating device illustrated in FIGS. 3 and 5.
Figure 47:
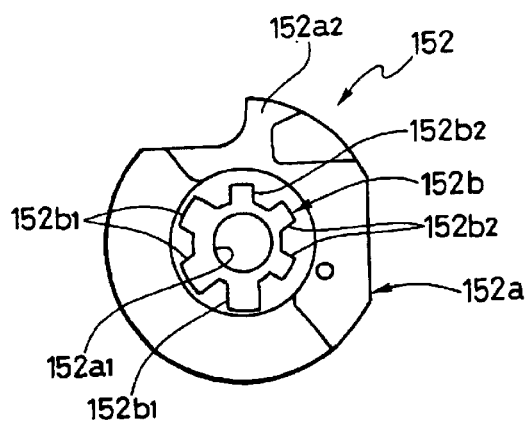
FIG. 47 is a bottom plan view of the cable winding member illustrated in FIGS. 44–46.

As seen in FIGS. 5 and 43, the lever retaining plate 138 is preferably a thin flat member. The lever retaining plate 138 is preferably constructed of a lightweight rigid material such as sheet metal. The lever retaining plate 138 is located on an opposite side of the intermediate plate 136 from the base plate 134. Thus, the lever retaining plate 138 is located furthest from the main mounting portion 132. The lever retaining plate 138 is fixedly and non-rotatably coupled to the main/shift mounting plate 132a via the fixing bolts 140 and 142. The lever retaining plate 138 basically includes a main support portion 138a and an extending portion 138b.

The main support portion 138a has a main hole $138a_1$, a pair of opposed auxiliary holes $138a_2$, and a pair of opposed retaining holes $138a_3$. The main hole $138a_1$ is configured to receive the main fixing bolt 140 therethrough. In this embodiment, one of the auxiliary holes $138a_2$ is used to receive a lower end of the pivot pin 148. In other words, the lever retaining plate 138 is identical to the lever retaining plate 38 but in the rear shift operating device 22, one of the auxiliary holes $138a_2$ has the pivot pin 148 partially received therein. The pair of retaining holes $138a_3$ are configured to receive projections of a main nut plate 141 to prevent loosening of the main fixing bolt 140 after the parts of the mounting assembly 124 are coupled together.

The extending portion 138b includes a secondary hole $138b_1$ and a pair of retaining holes $138b_2$. The secondary hole $138b_1$ is configured to receive the secondary fixing bolt 142 therethrough. The retaining holes $138b_2$ are configured to receive projections of a secondary bolt plate 143 to prevent loosening of the secondary fixing bolt 142 after the parts of the mounting assembly 124 are coupled together. Thus, the lever retaining plate 138, the intermediate plate 136, the base plate 134 and the main/shift plate 132a are fixedly and non-rotatably coupled together to form the housing or mounting assembly 124.

Referring to FIGS. 5 and 44–47, the winding mechanism 126 will now be discussed in more detail. The winding mechanism 126 is mounted on the main fixing bolt 140 between the base plate 134 and the intermediate plate 136 of the mounting assembly 124. The winding mechanism 126 basically includes a cable winding member 152, a ratchet member 154, a main biasing member 156 and a unit spacer 158. In the illustrated embodiment, the winding member 152 and the ratchet member 154 are preferably separate members that are non-rotatably coupled together. The main biasing member 156 is preferably a torsion spring that normally biases the winding member 152 and the ratchet member 154 in a predetermined rotational direction, e.g., the clockwise direction CW as seen in FIG. 5. The winding mechanism 126 is operatively coupled to the operating mechanism 128 and the retaining mechanism 130 to selectively retain the winding member 152 in one of a plurality of shift positions.

The winding member 152 is preferably a step-shaped member integrally formed as a one-piece unitary member. Moreover, the winding member 152 is preferably constructed of a lightweight rigid material such as hard plastic. The winding member basically includes a winding portion 152a and a projecting portion 152b. A central through opening $152a_1$ extends through both the winding portion 152a and the projecting portion 152b and is configured to receive the main fixing bolt 140 therethrough. Thus, the winding member 152 is coupled to the mounting assembly 124 for rotation about the main fixing bolt 140. The ratchet member 154 is preferably non-rotatably coupled to the winding member 152 and is located between the winding member 152 and the intermediate plate 136. Thus, the ratchet member 154 rotates with the winding member 152. As explained below, the rotational movement of the winding member 152 is controlled by the ratchet member 152.

The winding portion 152a includes a cable mounting section $152a_2$, a winding surface $152a_3$ and a spring receiving recess $152a_4$. The cable mounting section $152a_2$ includes a through opening configured to receive the inner wire of the control cable 23 and a recess configured to receive a nipple or abutment of the inner wire of the control cable 23 in a conventional manner. The winding surface $152a_3$ is a curved groove-shaped surface which extends circumferentially away from the cable mounting section $152a_2$. The spring receiving recess $152a_4$ is a substantially annular recess with a larger diameter than the central through opening $152a_1$. Moreover, the spring receiving recess $152a_4$ includes a cutout or notch $152a_5$ configured to receive one end of the spring 156 as discussed below. The spring receiving recess $152a_4$ preferably has a radial width sufficient to receive a portion the main spring 156 as also discussed below in more detail. The winding portion 152a also preferably includes a stepped groove $152a_6$ configured to receive a portion (not shown) of the indicating mechanism 146.

The projecting portion 152b basically includes a plurality of large splines $152b_1$ and a plurality of small splines $152b_2$ that are configured to non-rotatably engage the ratchet member 154. The large splines $152b_1$ are arranged on an opposite side of the central through opening $152a_1$ from the small splines $152b_2$. Moreover, the splines $152b_1$ and $152b_2$ are oriented such that the ratchet member 154 is arranged in a certain configuration in order to properly engage both the operating mechanism 128 and the retaining mechanism 130, as discussed below.

The ratchet member 154 is preferably a thin flat member. Preferably, the ratchet member 154 is constructed of a lightweight rigid material such as sheet metal. The ratchet member 154 basically includes a splined central opening 154a, an outer operating surface 154b and an outer positioning surface 154c. The opening 154a is configured to receive the projecting portion 152b of the winding member 152 to non-rotatably couple the ratchet member 154 to the winding member 152 in a predetermined orientation. In other words, the opening 154a mates with the large splines 152$b_1$ and the small splines 152$b_2$ of the projecting portion 152b so that the winding member 152 rotates with the ratchet member 154 as if they were a single piece.

The operating surface 154b is configured to engage a portion of the operating mechanism 128, which is discussed below. More specifically, the operating surface 154b includes a plurality (nine) of grooves 154$b_1$ that form teeth designed to selectively engage a portion of the operating mechanism 128. The positioning surface 154c is configured to engage a portion of the retaining mechanism 130 (which is also discussed below) to selectively hold and retain the ratchet member 154 and the winding member 152 in one of the plurality of shift positions. More specifically, the positioning surface 154c includes a plurality (nine) of projections or teeth 154$c_1$, which engage a portion of the retaining mechanism 130. Thus, the ratchet member 154 is a modified version of the ratchet member 54 in order to provide more shift positions. The ratchet member 154 also preferably includes a pair of stops 154d and 154e. Specifically, the stop 154d is a rest stop while the stop 154e is a fully shifted stop. The stops 154d and 154e selectively engage portions of the retaining mechanism 130 to control movements of the winding member 152 and the ratchet member 154. The ratchet member 154 is configured to have a smaller operating angle for each shift between an adjacent pair of shift positions than the ratchet member 54. Thus, the operating mechanism 128 is a modified version of the operating mechanism 28 in order to cooperate with the ratchet members 154 as explained below.

The biasing member 156 is preferably a torsion spring that is arranged to apply an urging force on the winding member 152 and the ratchet member 154 to rotate about the main fixing bolt 140. The biasing member (spring) 156 basically includes a first end 156a, a second end 156b and a coiled portion 156c extending between the first and second ends 156a and 156b. The first end 156a is arranged in the spring mounting slot 134c of the base plate 134, while the second end 156b is arranged in the notch or cutout 152$a_5$ extending from the spring receiving recess 152$a_4$ of the winding member 152. The coiled portion 156c is partially received in the spring receiving recess 152$a_4$. The unit spacer 158 is disposed in the central through opening 152$a_1$ of the winding member 152.

The unit spacer 158 is preferably a tubular member constructed of lightweight rigid material with one end contacting the lower surface of the base plate 134 and the other end contacting the upper surface of the intermediate plate 136 to space the intermediate plate 136 from the base plate 134. The spring 156 is configured to normally bias the winding member 152 in a clockwise direction as viewed from above in FIG. 5. Thus, the operating mechanism 128 moves the winding member 152 via the ratchet member 154 in a counter-clockwise direction against the urging force of the main biasing member 156. More specifically, the operating mechanism 128 preferably moves the winding member 152 to one of nine predetermined shift positions, as discussed below. The retaining mechanism 130 selectively retains the winding member 152 and the ratchet member 154 in one of the nine shift positions, as also discussed below.

Figure 63:
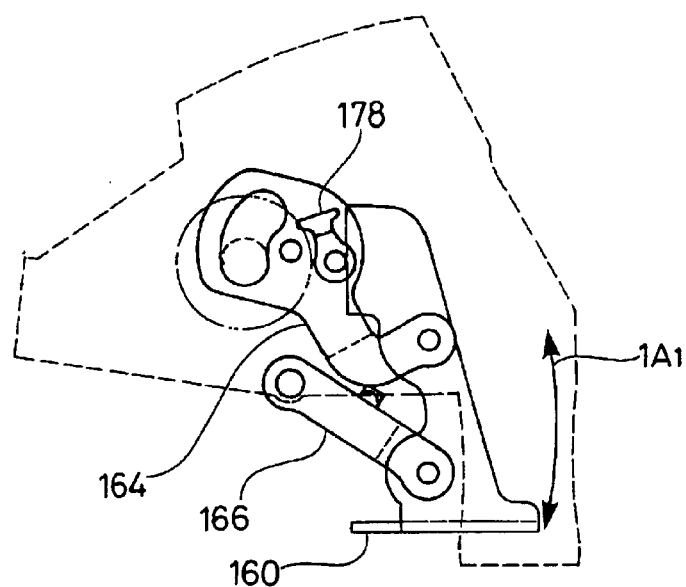
FIG. 63 is a partial top plan view of the rear shift operating device illustrated in FIGS. 3 and 5 with the first shift operating member in a rest position and portions broken away for the purpose of illustration.
Figure 64:
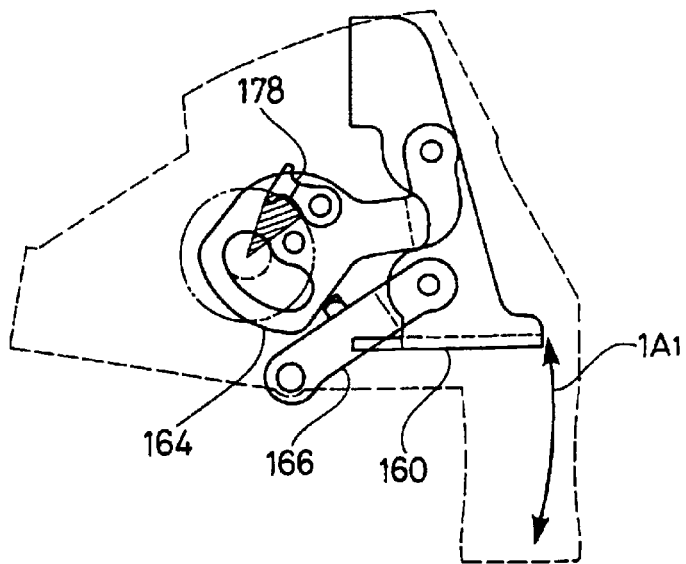
FIG. 64 is a partial top plan view of the rear shift operating device illustrated in FIGS. 3 and 5 with the first shift operating member in a shift position after moving the operating link an operating angle and portions broken away for the purpose of illustration.
Figure 65:
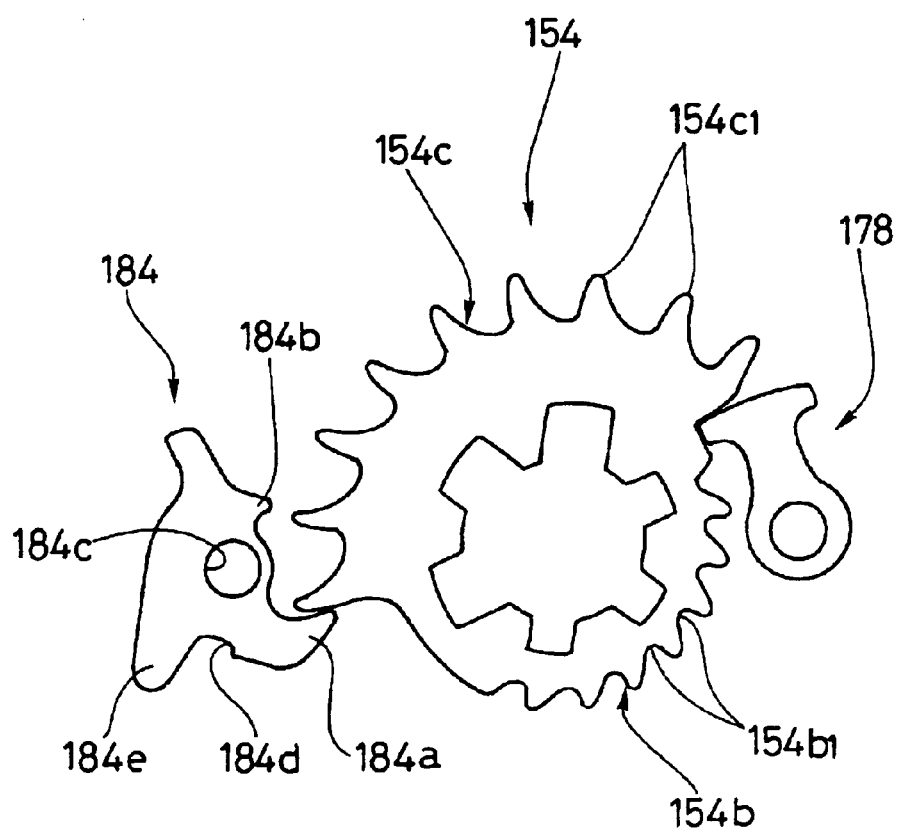
FIG. 65 is a top plan view of the pawl member, ratchet member and locking member of the rear shift operating device illustrated in FIGS. 3 and 5, showing the engagement/relationship between these members.
Figure 66:
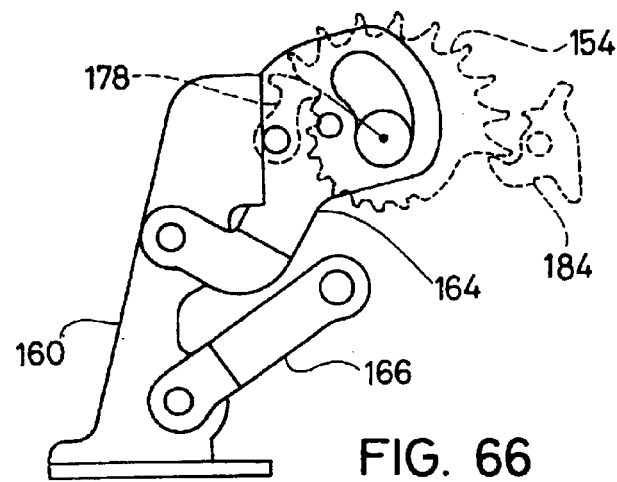
FIG. 66 is a bottom plan view of certain parts of the rear shift operating device illustrated in FIGS. 3 and 5 with the first shift operating member in a normal rest position and with the ratchet member, pawl member and locking member shown in broken lines in order to illustrate operation of the rear shift operating device.
Figure 67:
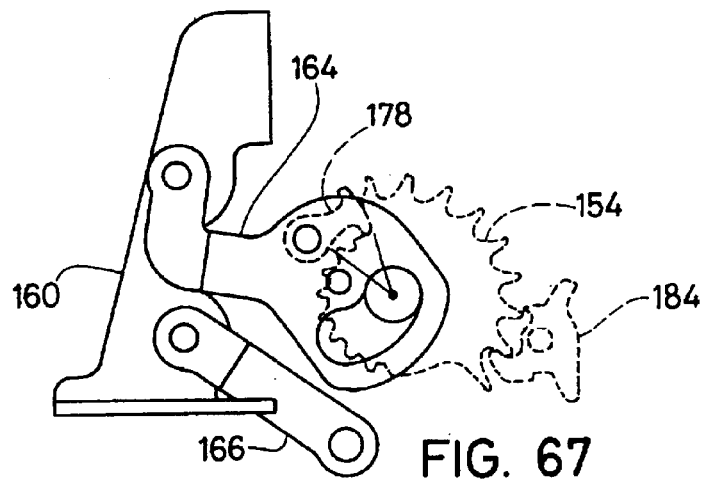
FIG. 67 is a bottom plan view of certain parts of the rear shift operating device illustrated in FIGS. 3 and 5 with the first shift operating member in a shift position and with the ratchet member, pawl member and locking member shown in broken lines in shifted positions in order to illustrate operation of the rear shift operating device.
Figure 68:
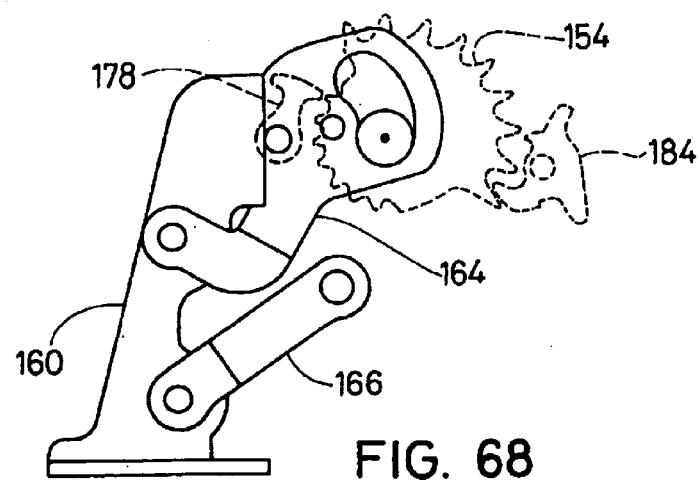
FIG. 68 is a bottom plan view of certain parts of the rear shift operating device illustrated in FIGS. 2, 4 and 6 with the first shift operating member moved back to the normal rest position and with the ratchet member, pawl member and locking member shown in broken lines after being shifted in order to illustrate operation of the rear shift operating device.

Referring now to FIGS. 5 and 49–61, the operating mechanism 128 will now be discussed in more detail. The operating mechanism 128 is a modified version of the operating mechanism 28 in order to accommodate the larger number of shift positions of the ratchet member 54 as explained below. The operating mechanism 128 basically includes a first operating member 160, a second operating member 162, an operating link 164 and a follower link 166. The first operating member 160 together with the operating link 164, the follower link 166 and the mounting assembly 124 form a four-bar linkage that controls movement of the first operating member 160. More specifically, the first operating member 160 is pivotally coupled to both the operating link 164 and the follower link 166 to move along a first arc 1$A_1$ as best seen in FIGS. 63 and 64. The operating link 164 is pivotally coupled on the pivot pin 148 (auxiliary fixed pivot axle) and operatively coupled on the main fixing bolt 140, while the follower link 166 is pivotally coupled to the secondary fixing bolt 142 (second fixed pivot axle). The first arc 1$A_1$ has a relatively flat curvature such that the first operating member 160 moves substantially in a straight line.

The operating link 164 preferably has a pawl mechanism 168 operatively coupled thereto. The pawl mechanism 168 is configured to engage the operating surface 154b of the ratchet member 154 when the first operating member 160 is pushed or moved by the rider from the normal rest position to the shift position. Thus, when the first operating member 160 is moved in a substantially linear direction along the arc 1$A_1$, the operating link 164 is also moved such that the pawl mechanism 168 rotates the ratchet member 154 one shift position against the urging force of the biasing member 156. Thus, the winding member 152 is also rotated to pull the inner wire of the shift cable 23 and shift the rear derailleur 17 to one of its shift positions.

When the first operating member 160 moves back to the normal rest position, the pawl mechanism 168 engages the release surface 136$a_5$ of the intermediate plate 136 to disengage the pawl mechanism from the ratchet member 154. However, the retaining mechanism 130 engages the ratchet member 154 to hold the winding member 152 and the ratchet member 154 in the new shift position against the urging force of the spring 156. In the illustrated embodiment, movement of the first operating member 160 causes only one shift of the winding member 152 from one shift position to the next adjacent shift position in one rotational direction.

The second operating member 162 is operatively coupled to the retaining mechanism 130 to selectively release the ratchet member 154 and the winding member 152. In other words, the rider pushes or moves the second operating member 162 to disengage the retaining mechanism 130 from the ratchet member 154, which allows the winding member 152 and the ratchet member 154 to rotate under the urging force of the spring 156. The retaining mechanism 130 is configured and arranged so that the winding member 152 and the ratchet member 154 rotate only one shift position for each push of the second operating member 162. In other words, the ratchet member 154 engages the retaining mechanism 130 after rotating one shift position. Thus, in the illustrated embodiment, movement of the second operating member 162 causes only one shift of the winding member 152 from one shift position to the next adjacent shift position in another rotational direction opposite to the rotational direction caused by moving the first operating member 160.

Figure 49:
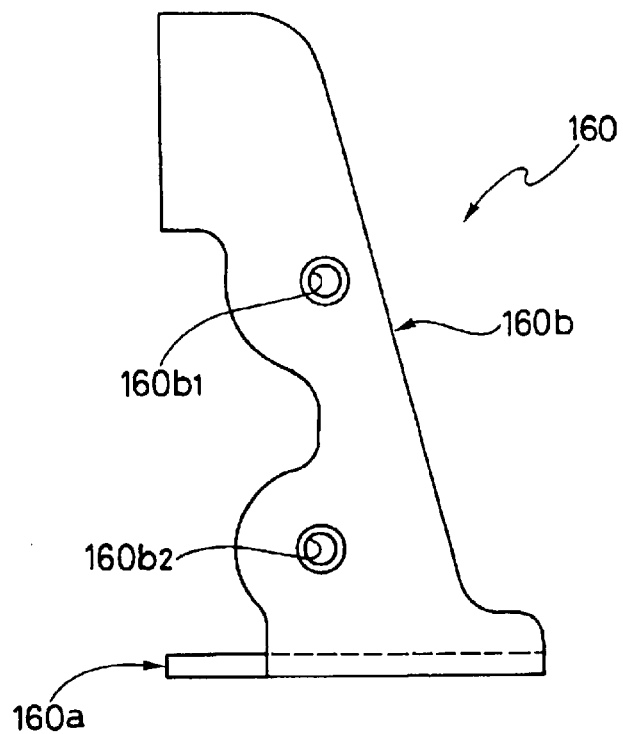
FIG. 49 is a top plan view of a first operating member of the rear shift operating device illustrated in FIGS. 3 and 5.
Figure 50:
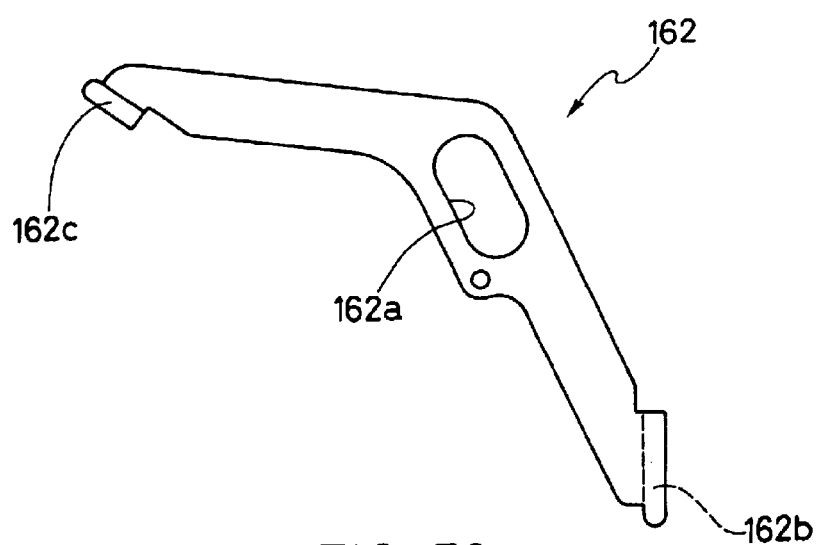
FIG. 50 is a top plan view of a second operating member of the rear shift operating device illustrated in FIGS. 3 and 5.
Figure 51:
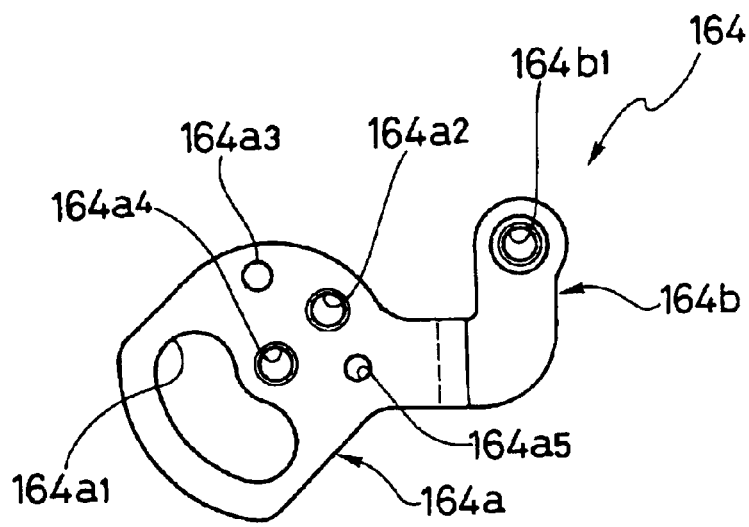
FIG. 51 is a top plan view of an operating link of the rear shift operating device illustrated in FIGS. 3 and 5.
Figure 52:
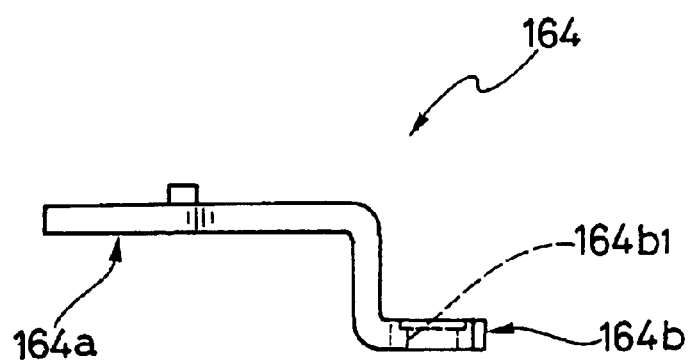
FIG. 52 is a side elevational view of the operating link illustrated in FIG. 51.
Figures 53, 54:
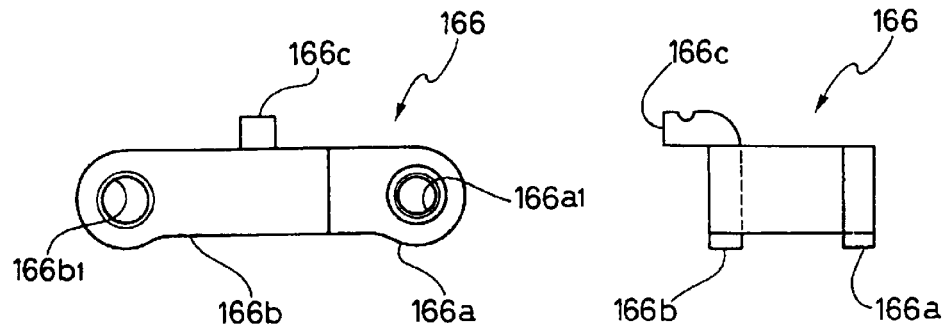
FIG. 53 is a top plan view of a follower link of the rear shift operating device illustrated in FIGS. 3 and 5.
FIG. 54 is a side elevational view of the follower link illustrated in FIG. 53.
Figure 55:
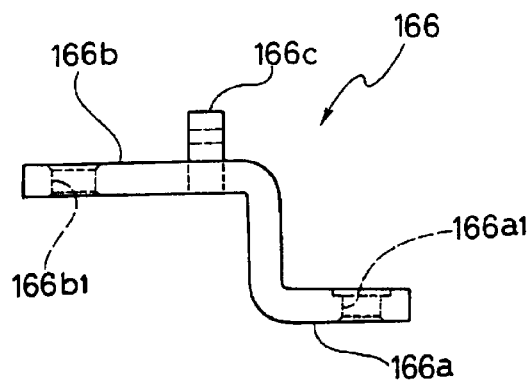
FIG. 55 is an end elevational view of the follower link illustrated in FIGS. 53 and 54.
Figure 56:
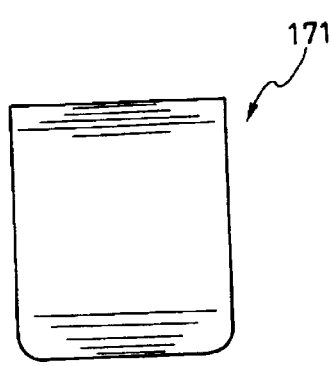
FIG. 56 is a front elevational view a tap lever of the rear shift operating device illustrated in FIGS. 3 and 5.
Figure 57:
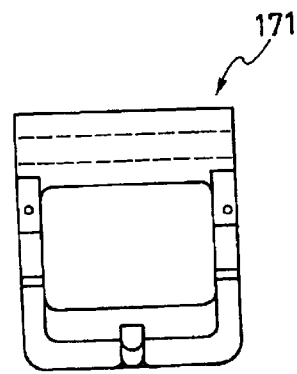
FIG. 57 is a rear elevational view of the tap lever illustrated in FIG. 56.
Figure 58:
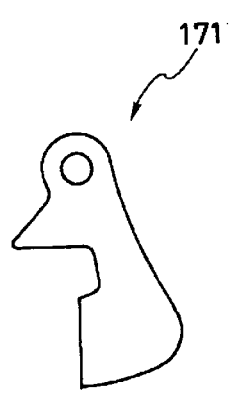
FIG. 58 is a side elevational view of the tap lever illustrated in FIGS. 56 and 57.
Figure 59:
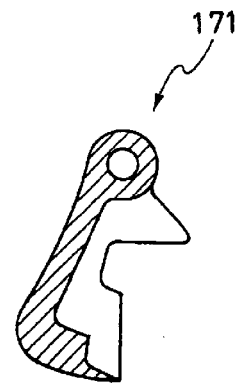
FIG. 59 is a cross-sectional view of the tap lever illustrated in FIGS. 56–58 as seen along section line 59—59 of FIG. 56.
Figure 60:
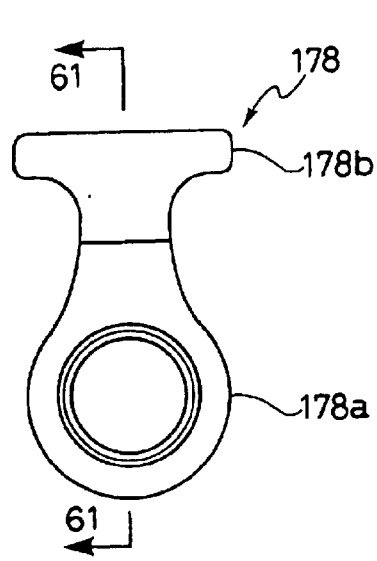
FIG. 60 is a top plan view of a pawl member of the rear shift operating device illustrated in FIGS. 3 and 5.
Figure 61:
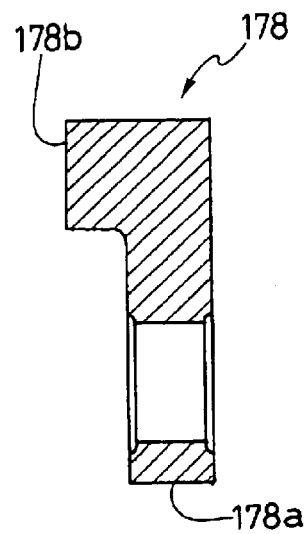
FIG. 61 is a cross-sectional view of the pawl member illustrated in FIG. 60 as seen along section line 61—61 of FIG. 60.

As best seen in FIGS. 5 and 49, the first operating member 160 is a thin flat member. The first operating member 160 is preferably constructed of lightweight rigid material such as deformed sheet metal. The first operating member 160 basically has an actuating portion 160a and a link portion 160b. The link portion 160b is preferably perpendicular to the actuating portion 160a. The link portion 160b includes a pair of holes 160$b_1$ and 160$b_2$ that are configured to receive the upper ends of a pair of pivot pins 169 and 170, respectively. The pivot pin 169 is pivotally coupled to the operating link 164, while the pivot pin 170 is pivotally coupled to the follower link 166 such that the first operating member 160 moves along the first arc $1A_1$. The actuating portion 160a can have a button 173 coupled thereto as seen in FIG. 3, and is arranged to be actuated or pushed by a thumb or finger of the rider.

The second operating member 162 is preferably a thin flat member constructed of lightweight rigid material such as deformed sheet metal. The second operating member 162 is slidably and pivotally mounted on the secondary fixing bolt 142. More specifically, the second operating member 162 is pivotally and slidably mounted on a spacer 163 that is mounted on the second fixing bolt 142 between the second operating member 162 and the follower link 166. The second operating member 162 basically includes an elongated opening 162a, an actuating flange 162b and a release flange 162c. The elongated opening 162a has an upper end of the spacer 163 received therein. The release flange 162c is received in the guide opening $136a_4$ of the intermediate plate 136 to control movement of the second operating member 162 together with the spacer 163, which is fixed.

The second operating member 162 is actuated by a tap lever 171 that is pivotally coupled to the mounting flanges $136c_1$ and $136c_2$ of the intermediate plate 136. More specifically, the tap lever 171 is operatively coupled to the actuating flange 162b such that when the rider pushes the tap lever 171 with a thumb or finger, the second operating member 162 moves in a substantially linear direction along a second arc (not shown) in manner substantially identical to the second operating member 62. More specifically, the release flange 162c is received in the guide opening $136a_4$ of the intermediate plate 136, while the upper end of the spacer 163 is received in the elongated opening 162a such that the actuating flange 162b moves along the second arc.

The second arc is substantially parallel to the arc $1A_1$ and both arcs preferably have large radii of curvature such that substantially linear parallel movement between the first and second operating members 160 and 162 is achieved. In other words, the arc $1A_1$ and the second arc are basically mirror images of the arcs $A_1$ and $A_2$ of the shift operating device 20. A return biasing member or spring 172 is operatively coupled between the second operating member 162 and the intermediate plate 136. Thus, when the rider releases the tap lever 171, the second operating member 162 and the tap lever 171 return to a normal rest position. The guide opening $136a_4$ of the intermediate plate 136 and the release flange 162c are configured to selectively engage/actuate the retaining mechanism 130 as discussed below.

The operating link 164 is preferably a thin flat step-shaped member constructed of a lightweight rigid material such as deformed sheet metal. More specifically, the operating link 164 basically includes an operating portion 164a and a coupling portion 164b. The coupling portion 164b can be considered a first portion of the operating link 164, while the operating portion 164a can be considered a second portion of the operating link 164. As mentioned above, the second or operating portion 164a of the operating link 164 is pivotally coupled to the pivot pin 148 (auxiliary pivot axle) and operatively coupled to the main fixing bolt 140 (first pivot axle), and the first or coupling portion 164b of the operating link 164 is pivotally coupled to the pivot pin 169, which is pivotally coupled to the first operating member 160. Thus, the first or coupling portion 164b of the operating link 164 is movably coupled to the first operating member 160. The operating portion 164a basically includes a main hole $164a_1$, a pawl mounting hole $164a_2$, a projection $164a_3$, and an auxiliary hole $164a_4$. The operating link 164 is a modified version of the operating link 64 and moves differently than the operating link 64, as explained below.

A spacer 165 is mounted on the main fixing bolt 140 and is fixed. The spacer 165 has a step-shaped exterior surface with a bottom end mounted in the main hole $164a_1$ of the operating link 164. The main hole $164a_1$ is shaped as an elongated circumferential guide opening larger than the lower end of the spacer 165. Thus, the operating link is movable along a transverse arc relative to the main fixing bolt 140. Specifically, the lower end of the spacer 165 slides relative to the operating portion 164a due to the configuration of elongated circumferential guide opening $164a_1$. The upper end of the spacer 165 contacts the intermediate plate 136 and surrounds the main hole $136a_1$ of the intermediate plate 136. Thus, the operating portion 164a of the operating link 164 is spaced from the intermediate plate 136.

The pivot pin 148 is fixed between the intermediate plate 136 and the lever retaining plate 138. Moreover, the pivot pin 148 extends through the auxiliary hole $164a_4$ such that the operating link 164 pivots about the pivot pin 148, not the main fixing bolt 140. Thus, the operating link 164 moves differently than the operating link 64. More specifically, the auxiliary hole $164a_4$ is closer to the pawl mounting hole $164a_2$ than the main hole $164a_1$ such that the pawl mechanism 168 moves a smaller operating angle than the pawl mechanism 68. In other words, the operating link 164 and the pawl mechanism 168 are configured to cooperate with the ratchet member 154, which has smaller operating angles between the various shift positions such that the first operating member 160 has a stroke substantially identical to the stroke of the first operating member 60 of the front shift operating device 20.

The pawl mechanism 168 is coupled to the pawl mounting hole $164a_2$ and basically includes a pawl pivot pin 174, a pawl spring 176 and a pawl member 178. The pawl pivot pin 174 has a lower end mounted in the pawl mounting hole $164a_2$ of the operating link 164. The pawl member 178 is mounted on the upper end of the pawl pivot pin 174 with the pawl spring 176 normally biasing the pawl member 178 relative to the operating link 164. Specifically, the pawl spring 176 has an upper end 176a coupled to the pawl member 178, a lower end 176b received in a spring mounting hole $164a_5$ of the operating link 164 and a coiled portion 176c surrounding the pawl pivot pin 174. The projection $164a_3$ of the operating link 164 acts as stop member or movement controlling member of the operating link 164. More specifically, the projection $164a_3$ is configured such that portions of the operating link 164 do not interfere with the movement of other members of the rear shift operating device 22 and/or control movement of the operating link 164.

The pawl member 178 basically includes a mounting portion 178a and a pawl portion 178b. The mounting portion 178a is thinner than the pawl portion 178b and is received on the pawl pivot pin 174. The pawl portion 178b is configured to selectively contact the operating surface 154b of the ratchet member 154. Specifically, when the operating link 164 is moved by the first operating member 160, the pawl portion 178b engages one of the grooves $154b_1$ of the operating surface 154b to rotate the ratchet member 154 and the winding member 152 about the main fixing bolt 140. However, when the first operating member 160 and the operating link 164 are in a normal rest position, the pawl portion 178b contacts the outer release surface $136a_5$ of the intermediate plate 136.

In other words, the outer release surface $136a_5$ is shaped to hold the pawl portion 178b out of engagement with the grooves $154b_1$ of the operating surface $154b$ when the operating link $164$ and the first operating member $160$ are in the normal rest positions. Thus, if the second operating member $162$ is actuated by the tap lever $171$, e.g., if the retaining mechanism $130$ is released as discussed below, the ratchet member $154$ and the winding member $152$ can rotate due to the urging force of the main biasing member $156$.

The coupling portion $164b$ of the operating link $164$ is offset from the operating portion $164a$ and basically includes a coupling hole $164b_1$. The coupling hole $164b_1$ is configured to receive the lower end of the pivot pin $169$ that is pivotally coupled to the first operating member $160$.

Referring again to FIGS. 5 and 53–55, the follower link $166$ basically includes an operating portion $166a$, a coupling portion $166b$ and a protrusion $166c$. The follower link $166$ is preferably a step-shaped thin flat member constructed of lightweight rigid material such as deformed sheet metal. The operating portion $166a$ is pivotally coupled to the pivot pin $170$ that is pivotally coupled to the first operating member $160$. The coupling portion $166b$ is pivotally coupled to the secondary fixing bolt $142$ via the spacer $163$. The operating portion $166a$ is offset from the coupling portion $166b$. The protrusion $166c$ extends upwardly from the coupling portion $166b$ and is configured to receive one end of a return biasing member (spring) $179$.

More specifically, the operating portion $166a$ includes a hole $166a_1$ configured to rotatably receive a lower end of the pivot pin $170$ while the coupling portion $166b$ includes a hole $166b_1$ configured to receive the lower end of the spacer $163$. The return biasing member $179$ has one end coupled to the protrusion $166c$ and the other end coupled to the intermediate plate $136$ to normally urge the follower link $166$ to the rest position. Thus, the first operating member $160$ and the first operating link $164$ are also normally biased to the rest position by the return biasing member (spring) $179$ since these members form three links of a four-bar linkage assembly.

Figure 62:
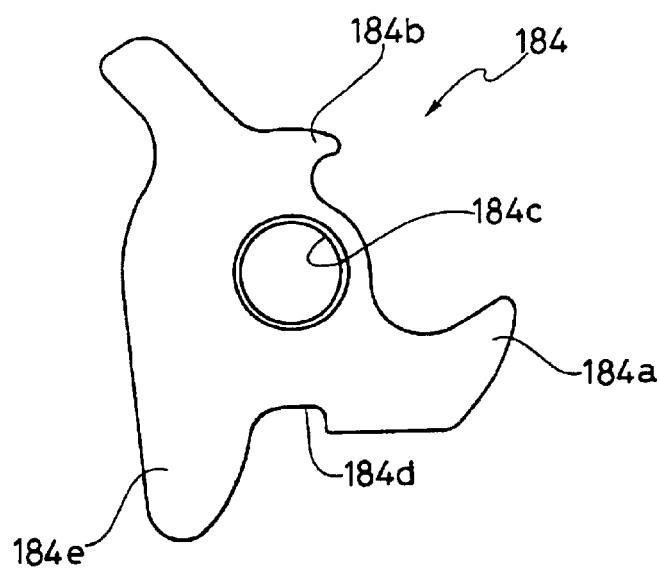
FIG. 62 is a top plan view of a locking member of the rear shift operating device illustrated in FIGS. 3 and 5.

Referring now to FIGS. 5 and 62, the retaining mechanism $130$ will now be discussed in more detail. The retaining mechanism $130$ basically includes a retaining pivot pin $180$, a retaining biasing member $182$ and a locking member $184$. The retaining pivot pin $180$ is coupled to the base plate $134$ and the intermediate plate $136$. The locking member $184$ is rotatably mounted on the retaining pivot pin $180$. The retaining biasing member $182$ normally biases the locking member $184$ toward a predetermined position. The locking member $184$ is arranged and configured to engage the positioning surface $154c$ of the ratchet member $154$. Moreover, the locking member $184$ is also arranged and configured to selectively engage the release flange $162c$ of the second operating member $162$.

More specifically, the retaining pivot pin $180$ has an upper end received in the mounting bore $134b$ of the base plate $134$, and a lower end received in the positioning hole $136a_3$ of the intermediate plate $136$. Thus, the retaining pivot pin $180$ and the base plate $134$ are non-movable relative to the main mounting portion $132$. The locking member $184$ is arranged on the lower end of the retaining pivot pin $180$ adjacent the guide opening $136a_4$ of the intermediate plate $136$. The biasing member $182$ has an upper end engaged with the projecting section $134d$ of the base plate $134$ and a lower end engaged with the locking member $184$ to normally bias the locking member $184$ in a predetermined direction.

The locking member $184$ basically includes a first stop portion $184a$, a second stop portion $184b$, a central hole $184c$, a spring receiving recess $184d$ and an actuating projection $184e$. The lower end of the retaining pivot pin $180$ is received in the hole $184c$ such that the locking member $184$ is located between the base plate $134$ and the intermediate plate $136$. The first and second stop portions $184a$ and $184b$ are arranged on opposite lateral sides of the teeth $154c_1$ of the ratchet member $154$. The spring receiving recess $184d$ is configured to receive the lower end of the biasing member $182$. The actuating projection $184e$ is arranged adjacent the release flange $162c$ of the second operating member $162$ that is received in the guide opening $136a_4$.

When the second operating member $162$ is actuated by the tap lever $171$, the release flange $162c$ engages the actuating projection $184e$ to rotate the locking member $184$ against the biasing force of the spring $182$. This moves the first stop portion $184a$ out of engagement with the positioning surface $154c$. Thus, the ratchet member $154$ and the winding member $152$ are rotated one shift position due to the biasing force of the main biasing member or spring $156$. When the tap lever $171$ is released, the locking member $184$ rotates via the biasing force of the spring $182$ to engage the next tooth of the positioning surface $154c$ to hold the ratchet member $154$ and the winding member $152$ in the desired shift position.

Operation of the rear shift operating device $22$ will now be discussed in more detail with reference to FIGS. 5 and 63–68. When the rider wishes to shift the rear derailleur $17$ and the chain C from a smaller rear sprocket RS to a larger rear sprocket RS, the rider pushes the first operating member $160$ with a thumb or finger. The first operating member $160$ moves alone the arc $1A_1$ to the shift position. This movement of the first operating member $160$ causes both the operating link $164$ and the follower link $166$ to rotate about the pivot pin $148$ and the secondary fixing bolt $42$, respectively. When the operating link $164$ rotates about the pivot pin $148$, the pawl mechanism $168$ moves with the operating link $164$. Also, the elongated main hole $164a_1$ slides along the spacer $165$.

When the pawl mechanism $168$ moves, the pawl member $178$ moves out of engagement with the release surface $136a_5$ of the intermediate plate $136$. The pawl member $178$ then engages the ratchet member $154$ to rotate the ratchet member $154$ and the winding member $152$ one shift position. When the ratchet member is rotated from one shift position to the next adjacent shift position by the pawl mechanism $168$, the locking member $184$ is moved out of engagement with its respective tooth $154c_1$ and into engagement with the next respective tooth $154c_1$. Specifically, as the ratchet member $154$ moves between two shift positions, the locking member $184$ disengages and then reengages the teeth $154c_1$ to retain the ratchet member $154$ in the next shift position.

When the first operating member $160$ is released by the rider, the first operating member $160$ moves back along the first arc $1A_1$ to its normal rest position. This movement of the first operating member $160$ causes the operating link $164$ and the follower link $166$ to rotate about the pivot pin $148$ and the secondary fixing bolt $142$, respectively. The operating link $164$ and the follower link $166$ rotate until they return to their normal rest positions. The pawl mechanism $178$ moves with the operating link $164$. Thus, the pawl member $178$ moves back into engagement with the release surface $136a_5$ so that the pawl member $178$ is out of engagement with the operating surface $154b$ of the ratchet member $154$. However, the ratchet member $154$ is retained in its shift position due to the locking member $184$. If the rider desires to shift from a smaller rear sprocket RS to a larger rear sprocket RS again, the first operating member $160$ is pushed again along the first arc $1A_1$ and the process described above is repeated.

If the rider desires to shift the rear derailleur 17 and the chain C from a larger rear sprocket RS to a smaller rear sprocket RS, the rider pushes the tap lever 171 with a thumb or finger. When the tap lever 171 is actuated by the rider, the second operating member 162 moves along the second arc from the normal rest position to the shift position. Specifically, movement of the second operating member 162 is controlled by the guide opening $136a_4$ of the intermediate plate and the spacer 163, which is coupled to the secondary fixing bolt 142. When the second operating member 162 is moved to the shift position, the release flange 162c engages the locking member 184. The locking member 184 is rotated against the biasing force of the spring 182 out of engagement with the teeth $154c_1$ of the ratchet member 154. The ratchet member 154 can then rotate under the biasing force of the main biasing member or spring 156.

The locking member 184 will then engage the next adjacent tooth $154c_1$ upon releasing the second operating member 162. Specifically, when the rider pushes the tap lever 171, the locking member 184 is disengaged from the teeth $114c_1$. However, when the rider then releases the tap lever 171, the second operating member 162 will return to its normal rest position under the biasing force of the return spring 172. Thus, the release flange 162c will release the locking member 184. In other words, the second operating member 162 is designed to be tapped and released relatively quickly by the rider. The locking member 184 then non-rotatably engages the next adjacent tooth $154c_1$ of the ratchet member 154 and the shift from the larger rear sprocket RS to the smaller rear sprocket RS is complete. This process can then be repeated by the rider if desired.

Of course, if the chain C is already on the smallest rear sprocket RS, the stops between the locking member 184 and the ratchet member 154 will prevent disengagement with the teeth $154c_1$. Therefore, if the rider pushes the tap lever 171 when the rear derailleur 17 is positioned under the smallest rear sprocket RS, a shift will not occur. Likewise, if the rear derailleur 17 is in its top position such that the chain C is arranged on the largest rear sprocket RS, the first operating member 160 cannot be shifted due to the stops between the locking member 184 and the ratchet member 154. Thus, a shift will not occur in this situation.

The terms of degree such as "substantially," "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle shift operating device, comprising:
   a first operating member;
   a cable winding mechanism mounted on a first pivot axle and configured to be selectively retained in one of a plurality of shift positions;
   an operating link having a first portion movably coupled to said first operating member and a second portion mounted on an auxiliary pivot axle, said auxiliary pivot axle being spaced from said first pivot axle and arranged to be parallel to said first pivot axle; and
   a winding pawl coupled to said operating link and operatively engaged with said cable winding mechanism such that movement of said operating link about said auxiliary pivot axle in a first rotational direction rotates said cable winding mechanism about said first pivot axle between said shift positions in response to movement of said first operating member.

2. The bicycle shift operating device according to claim 1, wherein
   said cable winding mechanism includes a cable winding member and a ratchet member mounted on said first pivot axle, and
   a locking member is operatively engaged with said ratchet member to hold said cable winding member in one of said plurality of shift positions.

3. The bicycle shift operating device according to claim 2, wherein
   said winding pawl is arranged to rotate said ratchet member upon movement of said first operating member from a normal rest position to a shift position.

4. The bicycle shift operating device according to claim 2, further comprising
   a second operating member arranged to disengage said locking member from said ratchet member.

5. The bicycle shift operating device according to claim 2, wherein
   said first operating member is pivotally coupled to a first end of a follower link that has a second end mounted on a second fixed pivot axle such that said first operating member, said operating link and said follower link form three links of a four bar linkage that controls movement of said first operating member.

6. The bicycle shift operating device according to claim 2,
   said cable winding member and said ratchet member are separate individual elements that are fixed to rotate together on said first pivot axle.

7. The bicycle shift operating device according to claim 2, wherein
   said cable winding mechanism further includes a biasing member arranged to apply an urging force on said cable winding member and said ratchet member to rotate about said first pivot axle.

8. The bicycle shift operating device according to claim 1, wherein
   said bicycle shift operating device is coupled to a handle bar mounting bracket that includes a brake lever.

9. The bicycle shift operating device according to claim 1, further comprising
   a return biasing member arranged to operatively apply an urging force on said first operating member to urge said first operating member from a shift position to a normal rest position.

10. The bicycle shift operating device according to claim 1, wherein
    said cable winding mechanism has more than three of said shift positions.

* * * * *